United States Patent [19]

Wakai et al.

[11] Patent Number: 5,659,420

[45] Date of Patent: Aug. 19, 1997

[54] CONFOCAL OPTICAL APPARATUS

[75] Inventors: Hideyuki Wakai; Kiyokazu Mizoguchi; Toru Suzuki; Keiji Terada; Masato Moriya; Manabu Ando; Koji Shio, all of Hiratsuka, Japan

[73] Assignee: Kabushiki Kaisha Komatsu SEisakusho, Tokyo, Japan

[21] Appl. No.: 436,469

[22] PCT Filed: Sep. 30, 1994

[86] PCT No.: PCT/JP94/01633

§ 371 Date: May 26, 1995

§ 102(e) Date: May 26, 1995

[87] PCT Pub. No.: WO95/09346

PCT Pub. Date: Apr. 6, 1995

[30] Foreign Application Priority Data

Sep. 30, 1993 [JP] Japan .................... 5-245438

[51] Int. Cl.$^6$ .................... G02B 21/00; G02B 21/36; G02B 21/22; G03H 1/00

[52] U.S. Cl. .................... 359/368; 359/369; 359/371; 359/370; 359/378; 359/385; 359/386; 359/30; 359/19; 359/20; 356/346; 356/347

[58] Field of Search .................... 359/368, 369, 371, 370, 376, 378, 385, 386, 389, 30, 19, 20, 15; 356/346, 347, 355, 358

[56] References Cited

U.S. PATENT DOCUMENTS

| 3,013,467 | 12/1961 | Minsky | 356/432 |
| 3,899,711 | 8/1975 | Lemmond | 313/458 |
| 5,144,540 | 9/1992 | Hayes | 362/268 |
| 5,329,178 | 7/1994 | Derndinger et al. | 250/234 |

FOREIGN PATENT DOCUMENTS

| 4035799 | 5/1992 | Germany | 359/369 |

Primary Examiner—Paul M. Dzierzynski
Assistant Examiner—Mohammad Y. Sikder
Attorney, Agent, or Firm—Diller, Ramik & Wight

[57] ABSTRACT

A confocal optical apparatus comprising a light source, a first aperture portion for passing light emitted from the light source and obtaining a point source, an objective lens for causing the light that has passed through the first aperture portion to converge on a measurement object, a second aperture portion located on a plane conjugate with the convergence surface on the measurement object, and light detectors for detecting light that has passed through the second aperture portion, wherein placing the first and second aperture portions in the same position and using them as the same aperture portion, as well as positioning the detection surfaces of the light detectors substantially on the same surfaces as the conjointly used identical aperture portions make it possible to reduce the size and weight of the apparatus, to perform three-dimensional shape measurements rapidly and accurately, and to facilitate the alignment of each portion.

9 Claims, 24 Drawing Sheets

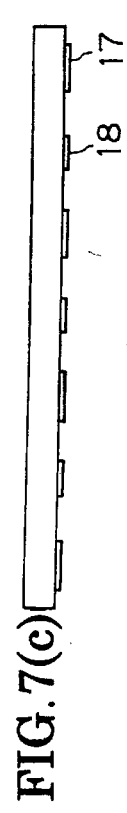 FIG.7(c) 17, 18

CONFOCAL OPTICAL APPARATUS

TECHNICAL FIELD

This invention relates to a three-dimensional shape measuring apparatus in which a confocal optical system is employed, and in particular relates to a confocal optical apparatus for performing three-dimensional measurements using a hologram or a diffraction grating-type half-mirror.

BACKGROUND ART

So-called confocal optical systems are apparatus for measuring distances. FIG. 22 illustrates the principle of a confocal optical system.

In FIG. 22, light from a light source 1 is condensed by a lens 12 and then directed toward a half-mirror 31 via a pinhole PH1 located at a focal point F1. The light from the light source 1 is transformed by the pinhole PH1 located at the focal point F1 into light equivalent to the a point source. Light reflected from the half-mirror 31 is condensed by a lens 8 and projected onto the surface of an object 9. Shown here is a case in which the surface of the object 9 is in the focal position F2 of the lens 8, and the object 9 is moved and scanned in the X-Y-Z direction by a three-dimensional moving stage 40. Light scattered on the surface of the object 9 passes through the lens 8, travels through the half-mirror 31, and converges toward a point F3 conjugate with the focal position of the light source 1. A pinhole PH2 is located in the position of this focal point F3, and transmitted light is detected by a light sensor 10.

With this structure, the focal point F3 on the conjugate point side moves when the object surface Z0 is shifted to the front or back (Z1 or Z2) of the focal position F2, as shown in FIGS. 23a and 23b, and the output of the light sensor 10 is markedly reduced by the action of the pinhole. FIG. 24 illustrates the relation between the position of the object surface and the output of the light sensor 10.

This structure makes it possible to shift the measurement object 9 by the three-dimensional moving stage 40 in the direction of the Z axis (in the direction of the optical axis) for each X-Y coordinate position, to sample the output of the light sensor 10 in the course of this displacement, and to designate the detected Z position corresponding to the maximum sampling output as the surface position of the object 9. It is therefore possible to subject the measurement object 9 to three-dimensional measurements by sequentially changing the X-Y coordinate position and performing the same measurements.

A disadvantage of this conventional apparatus, however, is that each measurement instant yields information about a single point in space, making it necessary to spend much time to detect the surface shape.

In view of this, an attempt was made in Japanese Laid-Open Patent Application 4-265918 to arrange the confocal optical system in two dimensions and to detect each object position in parallel; the corresponding structure is illustrated in FIG. 25.

Specifically, with the apparatus illustrated in FIG. 25 above, light from a light source i passes through lenses 12 and 2, becomes parallel light, and enters a pinhole array PHA1. The pinhole array PHA1 consists of pinholes arranged in a matrix. The light that has passed through the pinhole array PHA1 is transmitted through a half-mirror condensed by lenses 8a and 8b, and projected onto a measurement object 9. The measurement object 9 is placed on top of a moving stage 35 capable of displacement in the direction of the Z axis. The light reflected by the measurement object 9 is condensed by the lenses 8a and 8b, reflected by the half-mirror 31, and imaged at a position conjugate with the pinhole array PHA1. A pinhole array PHA2 is located in the imaging position, and the light passing through the pinholes is detected by the individual light sensors 10 of a light sensor array.

This conventional structure makes it possible to separately sample the outputs of the individual light Sensors 10 of the light sensor array while displacing the moving stage 35 in the direction of the Z axis, and to designate the detected Z-direction position corresponding to the maximum output of the individual light sensors as the surface position of the object 9.

Because this conventional technique dispenses with the need to move the moving stage in the XY direction, the measuring time can be reduced in comparison with the conventional mechanism illustrated in FIG. 22 above.

Even with the apparatus illustrated in FIG. 25, the moving stage 35 must be moved at a higher speed to further reduce the shape measurement time, but because the moving stage 35 must carry a measurement object, there is a limit to the high-speed movement. In other words, it is very difficult, for example, to use a high-speed moving stage to move a measurement object that is very heavy, a measurement object that has a very fine structure and thus cannot withstand the inertial force created by high-speed displacement, and the like.

Fixing the measurement object 9 and moving and displacing the measuring instrument itself in the Z direction was suggested as a way of overcoming this shortcoming. To be able to be displaced at a high speed, however, the measuring instrument itself must be small and lightweight, have a sturdy structure, and withstand the inertial force created by high-speed displacement. With the conventional technique illustrated in FIG. 25, however, no measures related to high-speed movement have been adopted, thus making it likely that the confocal optical system will break or that other undesirable phenomena will occur during high-speed movement. In particular, it is important for a confocal optical system that the pinhole arrays PHA1 and PHA2 always remain in exact conjugate positions with respect to the half-mirror 31 so that the confocal optical system is always effective, but in the past there has been a limit to reconciling this requirement with a need for a reduction in size and weight.

In addition, a prismatic device was usually used as the half-mirror 31 in FIG. 25, and because this prismatic device requires a cubic space, the focal position of the light source (pinhole array PHA1) and the light-receiving. focal point (pinhole array PHA2) have to be located outside of the cubic space containing the half-mirror 31, so it is impossible to make the distance between the lens 8a and each of the focal points smaller than the length of the cube of the half-mirror 31. In addition, the focal point of the light source of a confocal unit and the light-receiving focal point are located with respect to the half-mirror 31 at geometric distances that vary with each confocal unit. Thus, the conventional mechanism illustrated in FIG. 25 has limits as to the reductions in size and weight, and requires precise alignment between the focal point of the light source and the light-receiving focal point.

An object of this invention, which was devised in view of the foregoing, is to provide a confocal optical apparatus in which the size and weight can be reduced, which allows three-dimensional shape measurements to be performed rapidly and accurately, and in which the alignment of each portion is facilitated.

DISCLOSURE OF THE INVENTION

According to this invention, in a confocal optical apparatus comprising a light source, a first aperture portion for passing light emitted from this light source and obtaining a point source, an objective lens for causing the light that has passed through this first aperture portion to converge on a measurement object, a second aperture portion located on a plane conjugate with the convergence surface on this measurement object, and light detectors for detecting light that has passed through the second aperture portion, a distinctive feature is that the first and second aperture portions are located in the same position and are conjointly used as identical aperture portions, and the detection surfaces of the light detectors are located substantially on the same surfaces as the conjointly used identical aperture portions.

This invention involves conjointly using the first and second apertures as identical apertures and positioning the detection surfaces of the light detectors on substantially the same surfaces with these identical apertures, thereby making it possible to facilitate accurate alignment of the first and second apertures and the light detectors, and to render the structures of these portions thin, compact, and sturdy.

In addition, according to this invention, a confocal optical apparatus comprises a light source, an optical element for receiving light from this light source and acting as a half-mirror and a diffraction grating, a first condensing device which is positioned in contact with or close to this optical element and which is designed for condensing zero-order light from the optical element, a pinhole for passing light condensed by this first condensing device, and a second condensing device for condensing the light that has passed through this pinhole and causing the light to converge toward a measurement object, and for causing the light scattered on the measurement object to converge toward the pinhole; in which the optical element directs toward the first condensing device the first-order diffracted light of the light reintroduced via the pinhole and the first condensing device; and which further comprises a light detector for receiving the first-order diffracted light condensed by the first condensing device.

Specifically, since the structure of this invention is such that the light-receiving focal point and the focal point of the light source of the confocal optical system are in the same position, it is sufficient to form a common pinhole at the two focal points in this position, making it possible to obtain a stable confocal effect, dispensing with the alignment of the two focal points, and allowing the apparatus to be made small and lightweight. In addition, the confocal optical system can be accommodated within a very thin region because the arrangement is aimed at obtaining the effect of a half-mirror and a diffraction grating using a flat-plate hologram, a flat-plate, diffraction grate-type half-mirror, or some other optical element.

Furthermore, according to this invention, a confocal optical apparatus comprises a parallel slit light generating device for generating parallel slit light undergoing sequential movable scanning, an aperture array in which a plurality of apertures for light passage are arranged in two dimensions and which is designed to direct the parallel slit light from the parallel light generating device, an optical element for receiving light that has passed through the aperture array and acting as a half-mirror and a diffraction grating, a lens array which is positioned close to this optical element and which is composed of a plurality of two-dimensionally arranged lenses for condensing zero-order light from the optical element, a pinhole array comprising a plurality of two-dimensionally arranged pinholes for passing light condensed by each of the lenses of the lens array, and a condensing device for condensing the light that has passed through each pinhole and projecting the light onto a measurement object, and for causing the light scattered on the measurement object to converge toward each pinhole; in which the optical element directs toward the lens array the first-order diffracted light of the light reintroduced via each of the pinholes and the lens array; and which further comprises a light detector array comprising a plurality of two-dimensionally arranged light detectors for receiving the first-order diffracted light condensed by each of the lenses of the lens array, a movement control device for moving in the direction of the optical axis at least some of the parallel slit light generating device, aperture array, optical element, lens array, pinhole array, condensing device, and light detector array, and a three-dimensional distance measuring device for measuring the measurement object in three dimensions based on the output of each light detector in accordance with the movable scanning of the parallel slit light and with the movement control of the movement control device.

This invention involves directing parallel slit light toward a confocal optical system comprising two-dimensionally arranged apertures, lenses, pinholes, and light detectors, and receiving light reflected from a measurement object with the aid of the light detectors. The measurement object undergoes three-dimensional distance measurements based on the output of each light detector in accordance with the movable scanning of the parallel slit light and with the movable scanning of the movement control device.

Moreover, according to this invention, a confocal optical apparatus comprises a surface light ray generating device for generating surface light rays, an aperture array in which a plurality of apertures for light passage are arranged in two dimensions and which is designed to direct the surface light rays from the surface light ray Generating device, an optical element for receiving light that has passed through the aperture array and acting as a half-mirror and a diffraction grating, a lens array positioned close to this optical element and comprising a plurality of two-dimensionally arranged lenses designed for condensing zero-order light from the optical element, a pinhole array comprising a plurality of two-dimensionally arranged pinholes for passing light condensed by each of the lenses of the lens array, and a condensing device for condensing the light that has passed through each pinhole and projecting the light onto a measurement object, and for causing the light scattered on the measurement object to converge toward each pinhole; in which the optical element directs toward the lens array the first-order diffracted light of the light reintroduced via each of the pinholes and the lens array; and which further comprises a light detector array comprising a plurality of two-dimensionally arranged light detectors for receiving the first-order diffracted light condensed by each of the lenses of the lens array, a movement control device for moving in the direction of the optical axis at least some of the surface light ray generating device, aperture array, optical element, lens array, pinhole array, condensing device, and light detector array, and a three-dimensional distance measuring device for measuring the measurement object in three dimensions based on the output of each light detector in accordance with the movement control of the movement control device.

This invention involves directing surface light rays toward a confocal optical system comprising two-dimensionally arranged apertures, lenses, pinholes, and light detectors, and receiving light reflected from a measurement object with the aid of the light detectors. The measurement object undergoes three-dimensional distance measurements based on the output of each light detector in accordance with movable scanning by the movement control device.

The structure pertaining to this invention is thus aimed at obtaining results using pinholes that are in the same position as the light-receiving focal point and the light-source focal point of the confocal optical system, thus rendering the measuring device small, lightweight, and sturdy; adopting a structure in which all or part of the measurement device is movable results in rapid measurements, alignment, stability, measurement accuracy, and many other outstanding advantages.

BRIEF DESCRIPTION OF THE DRAWINGS

FIGS. 3a through 3c are diagrams illustrating the manner in which a hologram is exposed and the like.

FIGS. 7a through 7k are a flow chart illustrating another manufacturing sequence for a light detector array and a pinhole array.

FIGS. 19a and 19b are diagrams illustrating a fifth embodiment of this invention.

BEST MODE FOR CARRYING OUT THE INVENTION

This invention will now be described in detail through the embodiments shown in the accompanying drawings.

Figure 2:
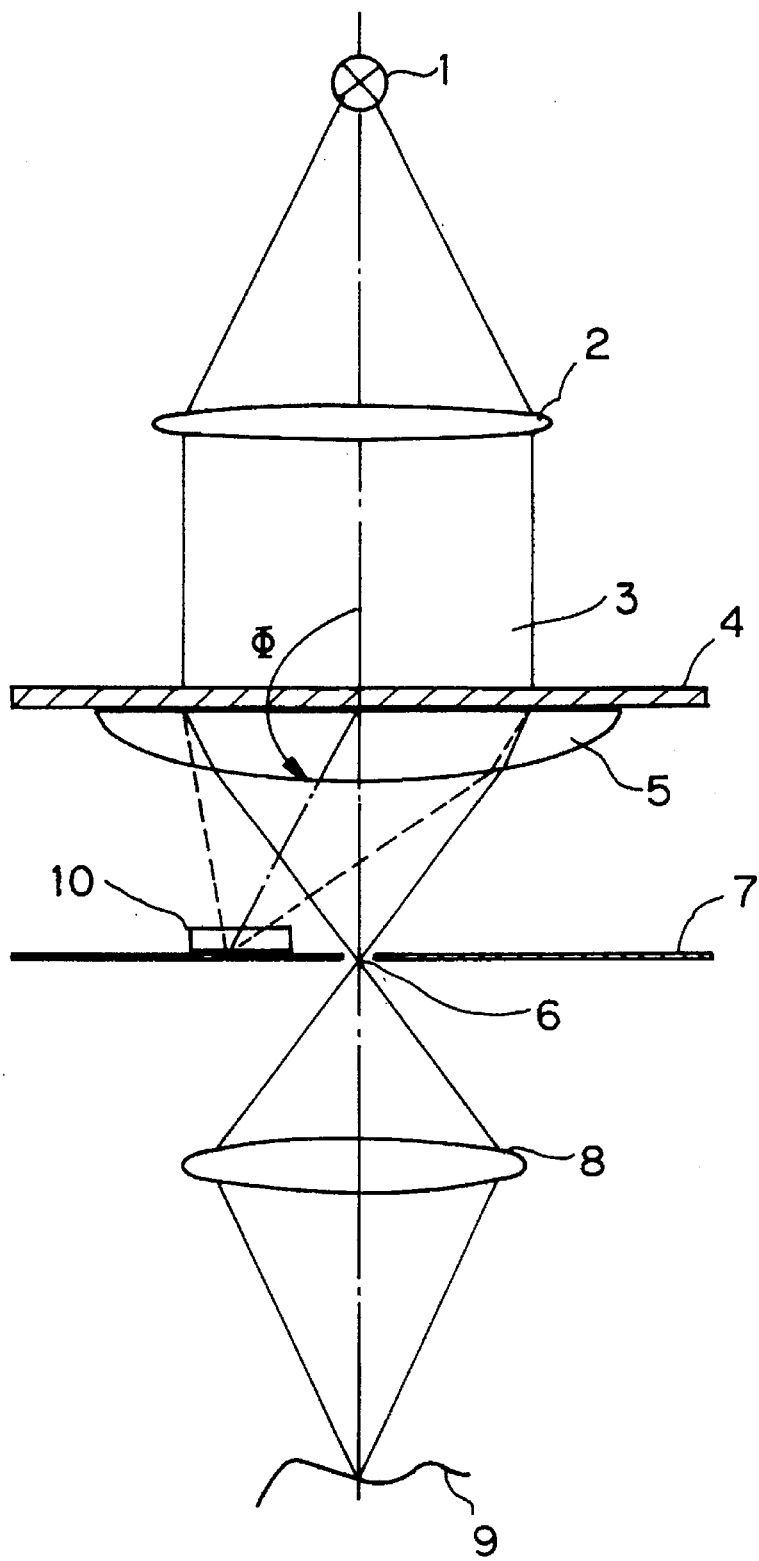
FIG. 2 is a diagram illustrating this invention in principle.

FIG. 2 illustrates the basic structure of this invention.

Figure 3A:
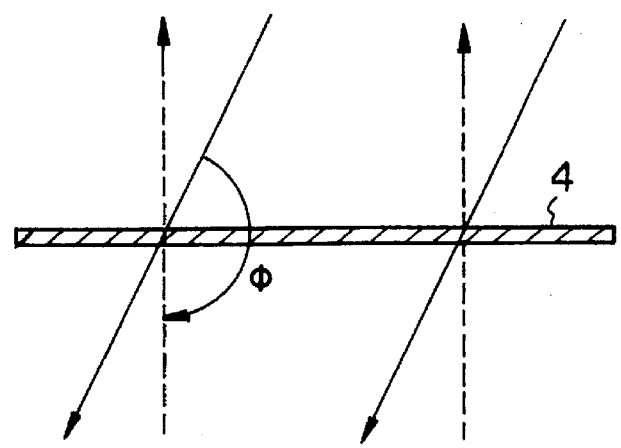
Figure 3B:
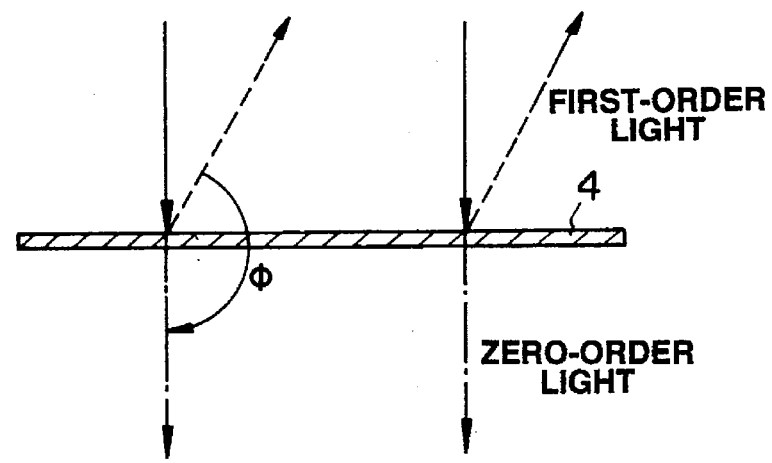
Figure 3C:
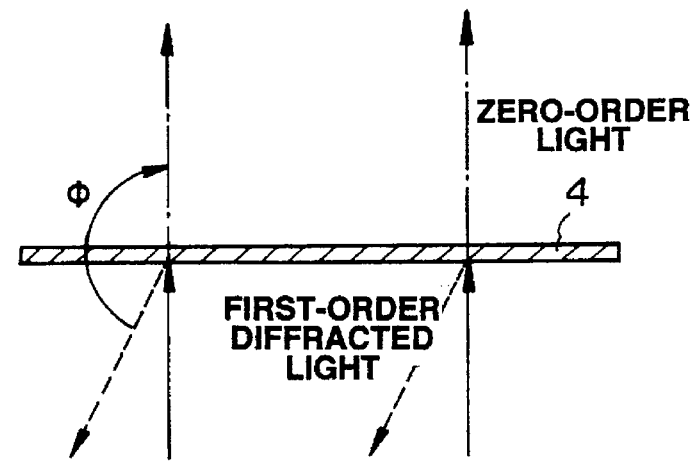

In FIG. 2, laser light (or monochromatic light based on the laser light) emitted from a light source 1 is transformed into parallel light 3 by a lens 2 and directed toward a reflection hologram 4. The reflection hologram 4, which acts as a half-mirror and a diffraction grating, is exposed to the parallel light that forms an angle Φ with the direction of the optical axis, as shown in FIG. 3a. When parallel light, which is shown by the solid lines in FIG. 3b, is incident on the hologram 4 developed, for example, to a diffraction efficiency of 40%, the respective intensities of zero-order light (chain line) and first-order light (broken line) will be 60% and 40% of the incident light. In addition, the respective intensities of zero-order light and first-order light will be 60% and 40% of the incident light when, as shown in FIG. 3c, this hologram is irradiated with parallel light opposite in direction to that shown in FIG. 3b.

In FIG. 2, the hologram 4 is irradiated with parallel light in the same direction as in FIG. 3b, and the resulting zero-order light is made to converge toward the focal position 6 by a lens 5 adjacent to the reflection hologram 4. A pinhole 7 is located in this focal position 6, and light passes through the hole of the pinhole 7. The light that has passed through the pinhole 7 is again condensed by a lens 8 and is directed toward a measurement object 9. Light reflected from the measurement object 9 is again condensed by the lens 8 and again passed through the pinhole 7. The light that has passed through the pinhole 7 is condensed by the lens 5 and is directed toward the hologram 4 assuming the form of parallel light opposite in direction to that of the parallel light 3 emitted from the light source. As shown in FIG. 3c, the first-order diffracted light of the parallel light incident on the hologram 4 is reflected at an angle Φ and condensed by the lens 5. A light detector 10 is installed in this convergence position, and the luminous energy of the incident light is detected by the light detector 10.

Specifically, with this system, the focal position on the light source side of the confocal optical system and the focal position on the light-receiving side are one and the same position 6, and a common pinhole 7 can be used. A stable confocal effect can therefore be obtained, and the conventional alignment between the focal point of the light source and the light-receiving focal point becomes unnecessary. In addition, the fact that the reflection hologram 4 functions as a half-mirror makes it possible to implement the miniaturization (flattening) and weight reduction unattainable with conventional structures.

Figure 1:
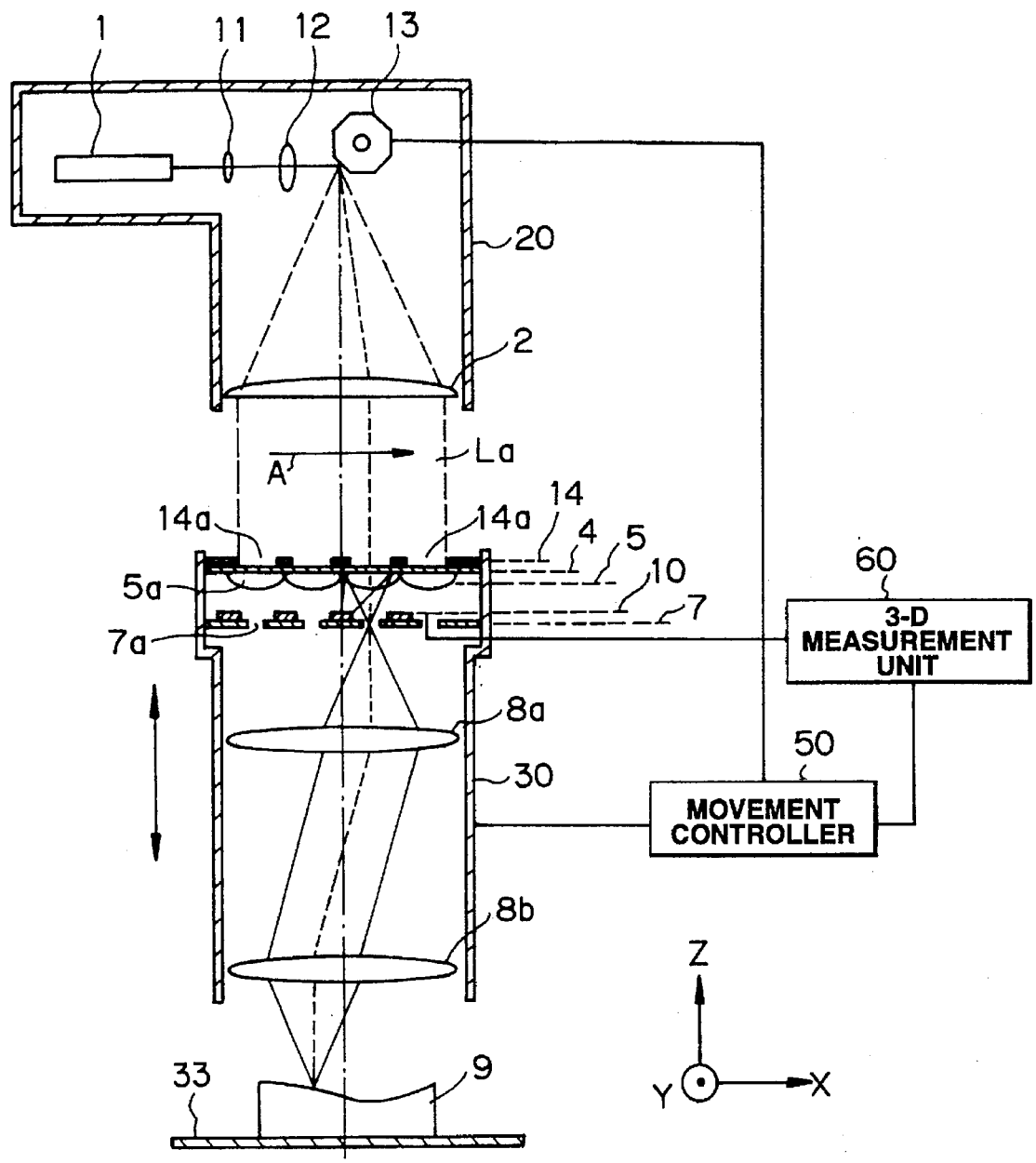
FIG. 1 is a diagram illustrating a first embodiment of this invention.

FIG. 1 illustrates a first embodiment of this invention; the apparatus comprises a fixed portion 20 and movable portion 30 that travels in the direction of the optical axis (Z direction).

Laser light emitted from a laser light source 1 is transformed into slit parallel light by lenses 11 and 12, and is deflected by a polyhedral rotating mirror 13. The deflected slit parallel light is directed toward a telecentrically located cylindrical lens 2, is deflected in the direction of the optical axis, and is sequentially scanned in the direction shown by the arrow A in the figure by the rotation of the polyhedral rotating mirror 13. The polyhedral rotating mirror 13 is rotated and scanned by a movement controller 50. Parallel slit light La scanned in the A direction is thus sequentially introduced from the fixed portion 20 into the movable portion 30.

It is also possible to use a galvano-mirror instead of the polyhedral rotating mirror 13, as it is to perform uniform scanning using an f-θ lens instead of the cylindrical lens 2.

An aperture array 14 in which apertures 14a for effectively directing light toward the individual lens 5a of a lens array 5 are formed at positions corresponding to the individual lenses is installed at the entrance pupil of the movable portion 30, and a reflection hologram 4 acting as a half-mirror and diffraction grating is installed underneath.

The reflection hologram 4 functions in the same manner as the holograms shown in FIGS. 2 and 3 above. The physical relationship between the upper and lower reflection hologram 4 and aperture array 14 may be reversed.

The lens array 5 is positioned close to or in contact with the reflection hologram 4 underneath the reflection hologram 4, and the zero-order light of the light incident on the hologram 4 is made to converge toward the focal position of each lens 5a. The pinholes 7a of a pinhole array 7 are located in the focal positions of the lenses 5a, and each of these condensed light rays passes through the pinholes 7a. The parallel slit light rays are made narrower than the pitch of the lenses 5a comprising the lens array 5.

Lenses 8a and 8b form a so-called telecentric system, and all the images of the pinhole array 7 are imaged in parallel in the direction of the optical axis. Therefore, the X-Y positions of the light spots imaged on a measurement object 9 do not change even when the movable portion 30 has been moved in the direction of the optical axis (Z axis).

Light scattered on the measurement object 9 is condensed by the lenses 8b and 8a, passed through the pinhole array 7 having a confocal effect, directed toward the lens array 5, and forced by the lenses 5a of the lens array 5 to strike the reflection hologram 4 in the direction coinciding with that shown in FIG. 3c, assuming the form of parallel light opposite in direction to the slit parallel light exiting from the lens 2. The first-order diffracted light rays of the reflection hologram 4 again strike the individual lenses 5a of the lens array 5 and converge at the respective angles Φ. A light detector array 10 is installed in such a way that individual light detectors 10a are located in each of these convergence positions.

This structure involves fixedly installing a measurement object 9 on a suitable table 33. Meanwhile, the movable portion 30 is moved by a movement controller 50 in the direction of the optical axis (Z axis) in synchronism with the rotational scanning performed by the polyhedral rotating mirror 13. A three-dimensional measurement unit 60 sequentially samples the outputs of individual detectors 10a of the light detector array 10 during the movement of the movable portion 30, and the Z position detected when each of the outputs reaches a maximum is designated as the position of the object surface.

Figure 4:
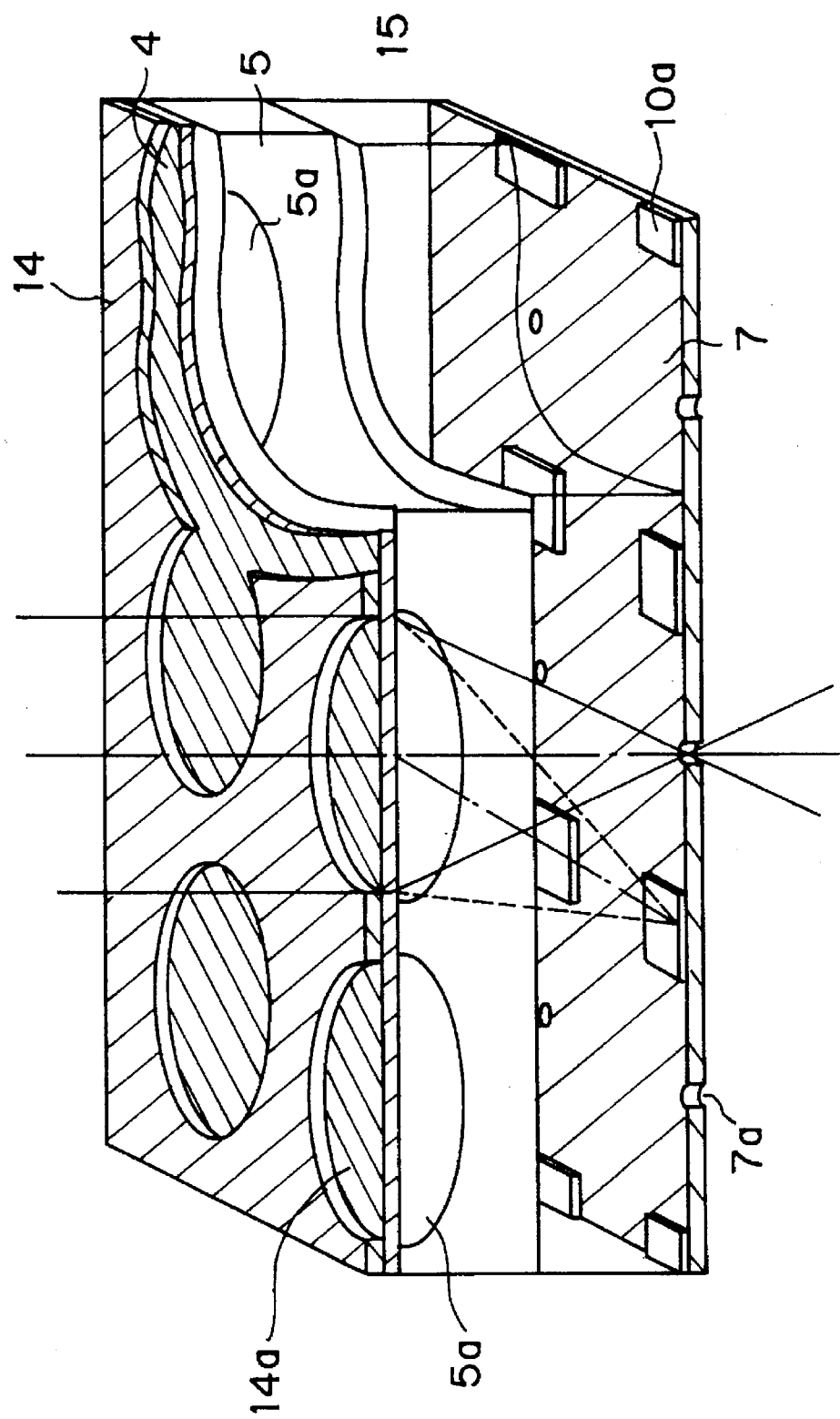
FIG. 4 is a perspective cross section illustrating the structures of a hologram, lens array, light detector array, and other components.
Figure 5:
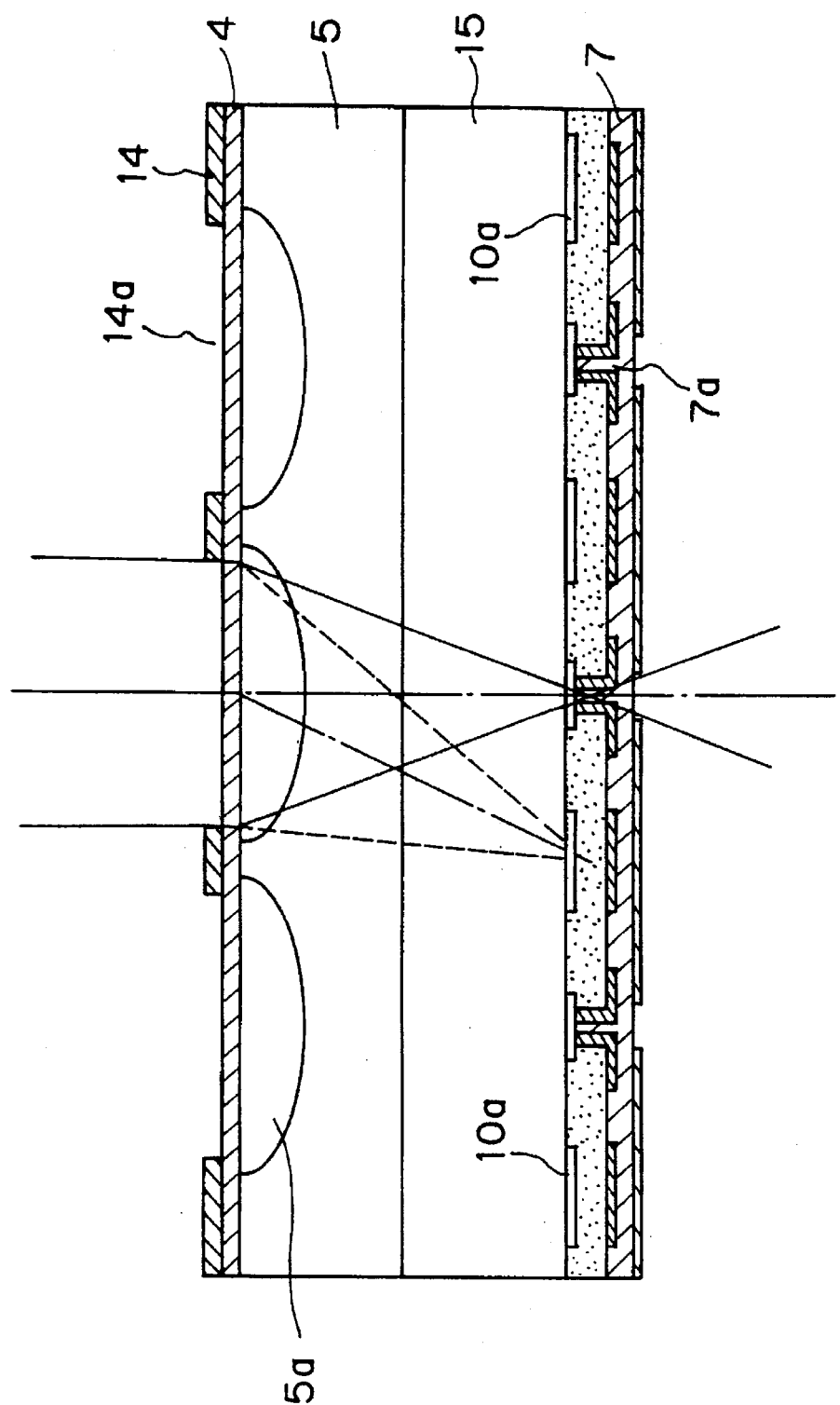
FIG. 5 is a cross section illustrating the structures of a hologram, lens array, light detector array, and other components.
Figure 6A:
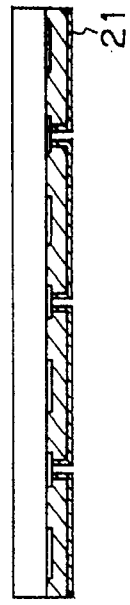
FIGS. 6a through 6j are a flow chart illustrating an example of a manufacturing sequence for a light detector array and a pinhole array.
Figure 6B:
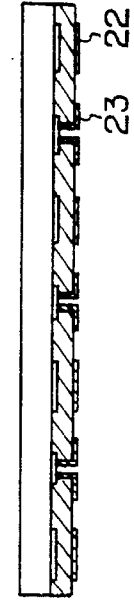
Figure 6C:
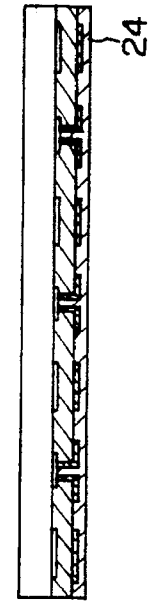
Figure 6D:
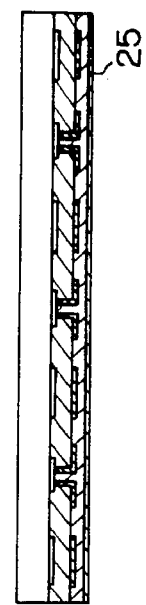
Figure 6E:
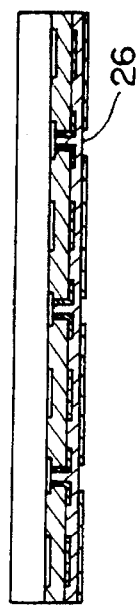
Figure 6F:
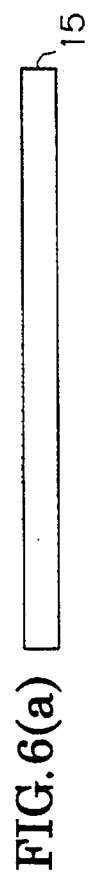
Figure 6G:
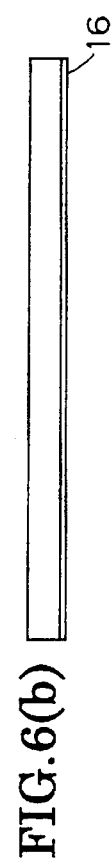
Figure 6H:
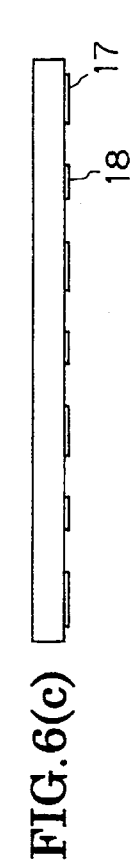
Figure 6I:
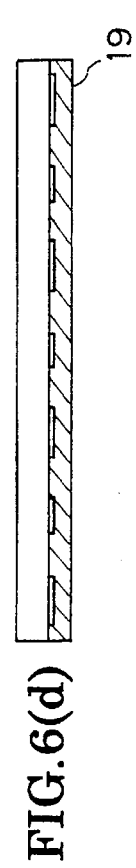
Figure 6J:
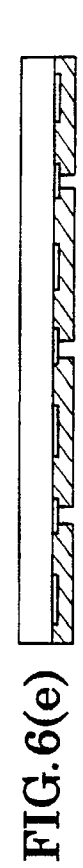
Figure 7F:
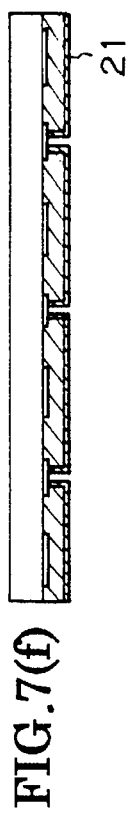
Figure 7G:
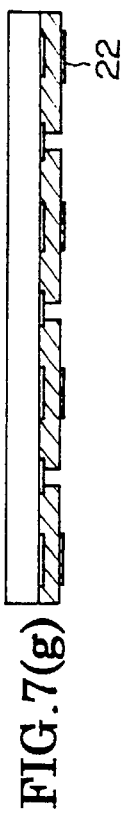
Figure 7H:
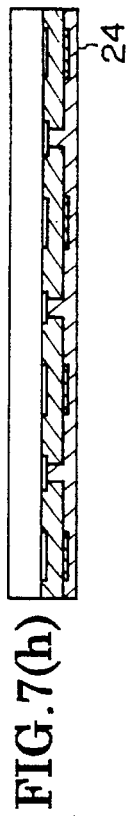
Figure 7I:
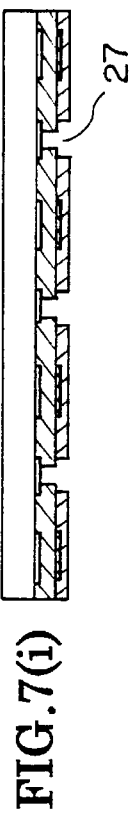
Figure 7J:
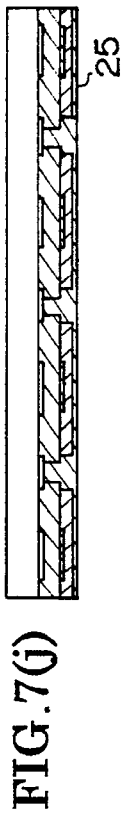
Figure 7K:
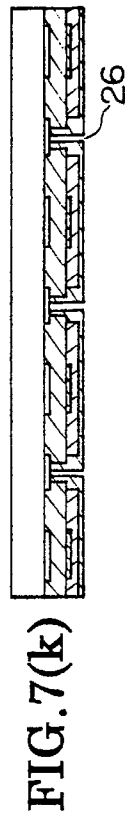
Figure 7A:
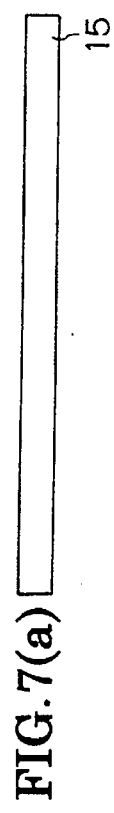
Figure 7B:
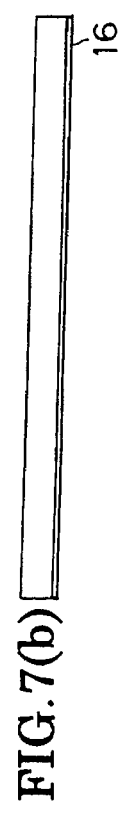
Figure 7D:
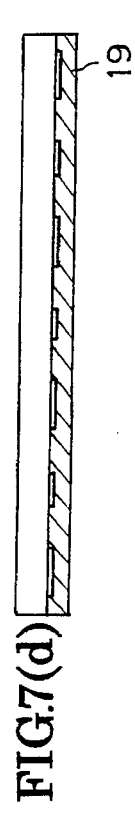
Figure 7E:
Figure 8F:
FIGS. 8a through 8j are a flow chart illustrating another manufacturing sequence for a light detector array and a pinhole array.
Figure 8G:
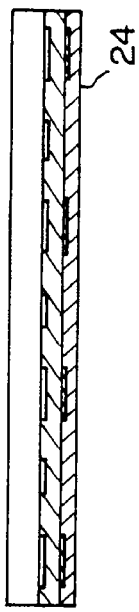
Figure 8H:
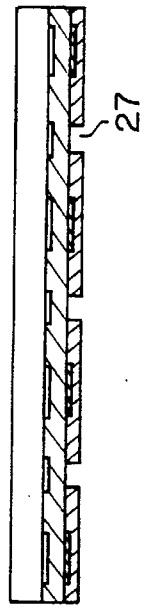
Figure 8I:
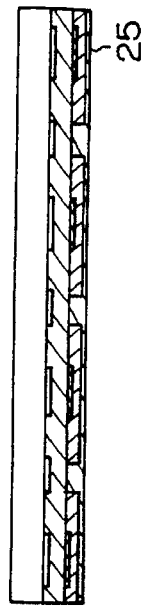
Figure 8J:
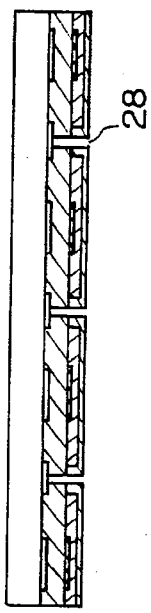
Figure 8A:
Figure 8B:
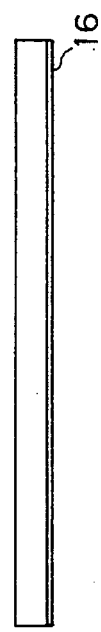
Figure 8C:
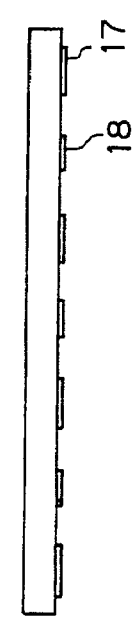
Figure 8D:
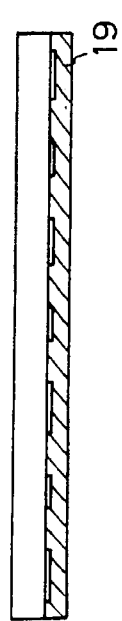
Figure 8E:
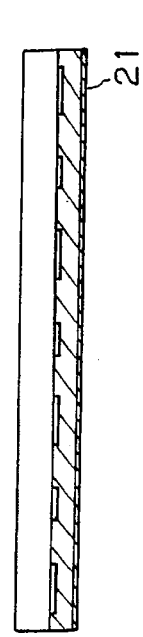

In addition, the aperture array 14, reflection hologram 4, lens array 5, light detector array 10, and pinhole array 7 of this structure are formed into a flat assembly by a semiconductor process, as shown in FIGS. 4 and 5.

Specifically, the aperture array 14 in FIGS. 4 and 5 consists of a shielding plate, and apertures 14a are formed in this plate at positions corresponding to each of the lenses 5a. The shielding film of the aperture array 14 is formed, for example, by sputtering a three-layer $Cr_2O_3/Cr/Cr_2O_3$ film. Light reflected by the chromium contained in the intermediate layer of the three-layer film is subjected to multiple reflection and decay by the $Cr_2O_3$ film.

A planar microlens (PML) may be used in this case as the lens array 5. With a planar microlens, multiple lens 5a portions are fabricated by creating a refractive index distribution through the selective dispersion of ions within a flat glass substrate 5. A nonreflective coating is applied to the light-admitting portion of each lens portion 5a of the lens array 5.

An exposed and developed hologram 4 is bonded along the section shown in FIG. 3a to the glass substrate 5 of the lens array thus fabricated, and an aperture array 14 is then formed on top of this. If heat resistance is a problem during the manufacture of the hologram 4, it is permissible to form the aperture array 14 on the glass substrate of the lens array 5 and then to bond the exposed and developed hologram 4 on top of this.

In addition, a light detector array 10 and pinhole array 7 are formed at a pitch corresponding to the lens pitch of the lens array 5 on a planar glass substrate 15 in which a nonreflective coating is formed on the surface bonded to the glass substrate 5.

This portion is formed by aligning and bonding the planar glass substrate 15 (in which the light detector array 10 and pinhole array 7 have been formed) with the glass substrate 5 (in which the aperture array 14, hologram 4, and lens array 5 have been formed).

When the microlens substrate 5 and the glass sensor substrate 15 are bonded, the space between the two is filled with a transparent refractive liquid that has substantially the same refractive index as glass, making it possible to prevent irregular reflection from occurring at the interface between these substrates.

Similarly, when the microlens substrate 5 and the hologram 4 are bonded, the space between the two is filled with a transparent refractive liquid that has substantially the same refractive index as glass,. making it possible to prevent irregular reflection from occurring at the interface between these substrates.

FIGS. 6a through 6j illustrate the process for manufacturing the pinhole array 7 and light detector array 10. The details of the process will now be described in accordance with the manufacturing sequence.

(a) Planar glass substrate 15.

(b) A transparent conductive film (TCO) 16 is formed on the planar glass substrate 15. $SnO_2$ or the like is used for the TCO.

(c) Except for the light detector element portions 17 and pinhole portions 18, everything is removed from the transparent conductive film 16 by, for example, etching or the like. The purpose of retaining the transparent conductive film of the pinhole portions in this process is to prevent the glass of the aperture portions of the pinholes from being abraded by the etching of the subsequent process (g).

(d) Amorphous silicon 19 is formed on top of this.

(e) The pinhole portions 18 of the amorphous silicon 19 are removed using etching or the like.

(f) A nickel film 21 is formed.

(g) Except for the light detector element portions 17 and pinhole portions 18, everything is removed from the nickel film 21 by, for example, etching or the like. Each pinhole aperture is also formed by etching.

(h) A transparent insulating film 24 is formed on this overcoat.

(i) A nickel film 25 is then formed.

(j) The pinhole portions 26 of the nickel film 25 are formed by etching.

Light detection elements comprising amorphous silicon 19, transparent anode electrodes 17, and metal cathode electrodes 22 are formed by this series of treatments, and pinhole shielding portions are formed from the nickel films 23 and 25.

FIGS. 7a through 7k illustrate another manufacturing method. The details of this method will now be described in accordance with the manufacturing sequence.

(a) Planar glass substrate 15.

(b) A transparent conductive film (TCO) 16 is formed on the planar glass substrate 15.

(c) Except for the light detector element portions 17 and pinhole portions 18, everything is removed from the transparent conductive film 16 by, for example, etching or the like. The purpose of retaining the transparent conductive film of the pinhole portions in this process is to prevent the glass of the aperture portions of the pinholes from being abraded by the etching of the subsequent processes (e) and (k).

(d) Amorphous silicon 19 is formed on top of this.

(e) The pinhole portions 18 of the amorphous silicon 19 are removed using etching or the like.

(f) A nickel film 21 is formed.

(g) Except for the light detector element portions 22, everything is removed from the nickel film 21 by, for example, etching or the like.

(h) An insulating film 24 is formed on this overcoat.

(i) The insulating film 24, amorphous silicon 19, and pinhole portions 27 are removed by etching or the like.

(j) A nickel film 25 is then formed.

(k) The pinhole 26 portions of the nickel film 25 are removed by etching to form pinholes.

Light detection elements comprising amorphous silicon 19, transparent anode electrodes 17, and metal cathode electrodes 22 are formed by this series of treatments, and a pinhole shielding portion is formed from the nickel film 25.

FIGS. 8a through 8j illustrate yet another manufacturing method. The details of this method will now be described in accordance with the manufacturing sequence.

(a) Planar glass substrate 15.

(b) A transparent conductive film (TCO) 16 is formed on the planar glass substrate 15.

(c) Except for the light detector element portions 17 and pinhole portions 18, everything is removed from the transparent conductive film 16 by, for example, etching or the like. The purpose of retaining the transparent conductive film of the pinhole portions in this process is to prevent the glass of the aperture portions of the pinholes from being abraded by the etching of the subsequent process (j).

(d) Amorphous silicon 19 is formed on top of this.

(e) A nickel film 21 is formed.

(f) Except for the light detector element portions 22, everything is removed from the nickel film 21 by, for example, etching or the like.

(g) An insulating film 24 is formed on this overcoat.

(h) The pinhole portions 27 are removed from the insulating film 24 by etching or the like.

(i) A nickel film 25 is then formed.

(j) The pinhole portions 28 of the nickel film 25 and amorphous silicon 19 are removed by etching to form pinholes.

Light detection elements comprising amorphous silicon 19, transparent anode electrodes 17, and metal cathode electrodes 22 are formed by this series of treatments, and a pinhole shielding portion is formed from the nickel film 25. Specifically, this manufacturing method allows the pinhole portions of the nickel film 25 and amorphous silicon 19 to be removed simultaneously by the process (j) etching.

Figure 9:
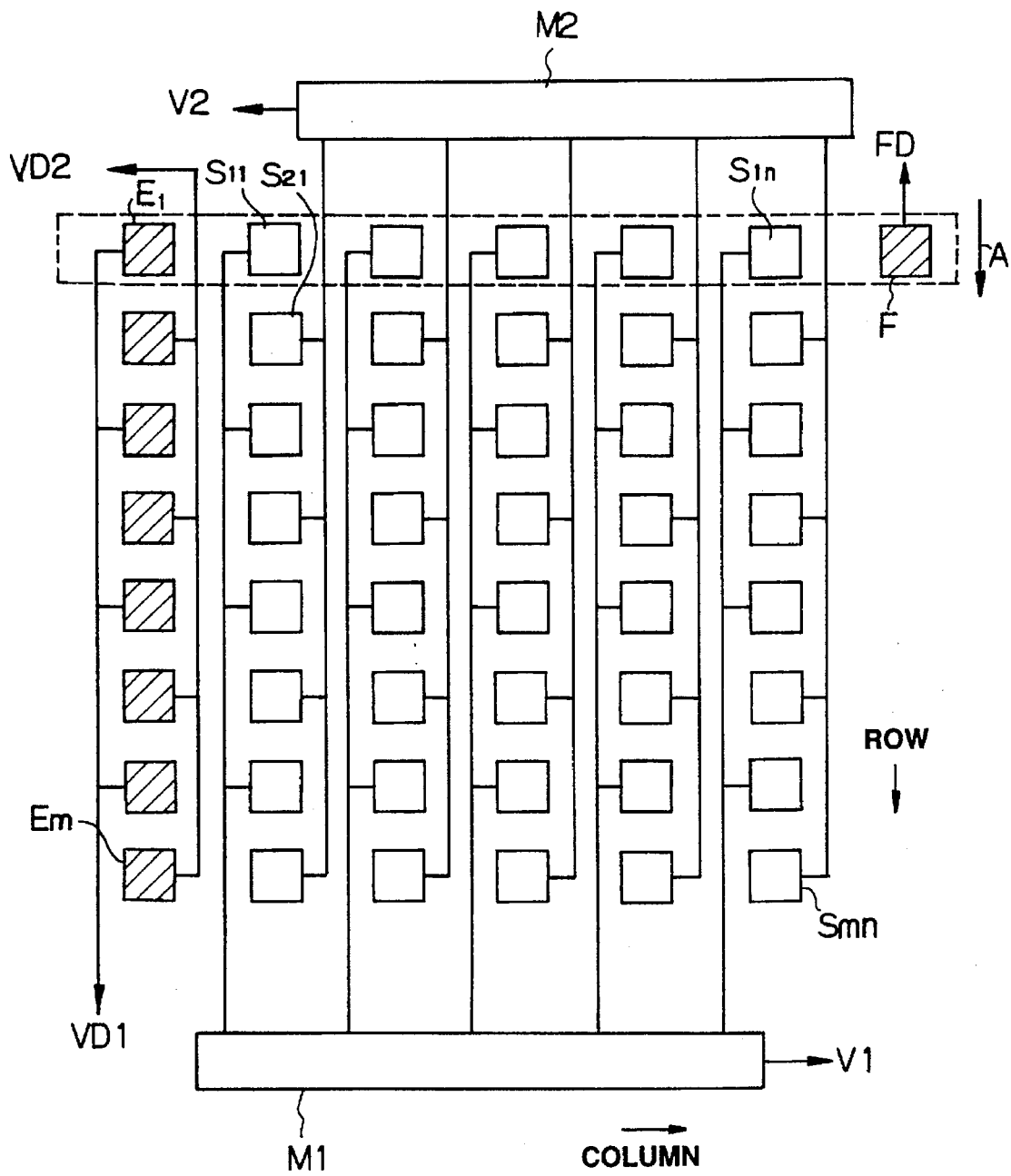
FIG. 9 is a diagram illustrating an example of a drive circuit for a light detector array.

FIG. 9 illustrates a light detector array 10 composed of n À m light detectors S11 through Snm, and a circuit structure for reading the signals from these light detectors S11 through Snm. For odd columns, the light detectors in each row are connected to an analog multiplexer M1 by a common connecting line, and for even columns, the light detectors in each row are connected to an analog multiplexer M2 by a common line. The hatched light detectors E1 through Em are designed to generate read timing signals VD1 and VD2 for column units, and a light detector F is designed to output timing signals FD for starting a read scan cycle.

The area inside the broken line in FIG. 9 is irradiated at a certain point in time by the parallel slit light La in FIG. 1, and the irradiated area is movably scanned in the direction of arrow A by performing a scanning procedure using a polyhedral rotating mirror. Specifically, parallel slit light is alternately and movably scanned in the direction from the odd columns toward the even columns; signals detected by the light detectors of the odd columns are successively read by the multiplexer M1 for each row, and signals detected by the light detectors of the even columns are successively read by the multiplexer M2 for each row.

This structure allows the two types of signals to be read independently for each column even when irradiation is performed using incident parallel slit light that covers both the odd and even columns. It is therefore possible to position light detectors close to each other, to reduce the surface area of the shielding portion of the aperture array 14, and to miniaturize the structure of this portion.

In FIG. 9, the hatched light detectors E1 through Em for generating timing signals are located in the matrix positions designated for the pinholes 7 at the ends of the light detector matrix, and are directly irradiated by the parallel slit light La from the fixed portion 20. Signals VD1 are designed to determine the read timing of the odd columns, and signals VD2 are designed to determine the read timing of the even columns. In addition, a light detector F for generating read start timing signals FD is located, for example, in a matrix position designated for the pinhole 7 at the opposite end with respect to the light detector E1 of the first column.

Figure 10:
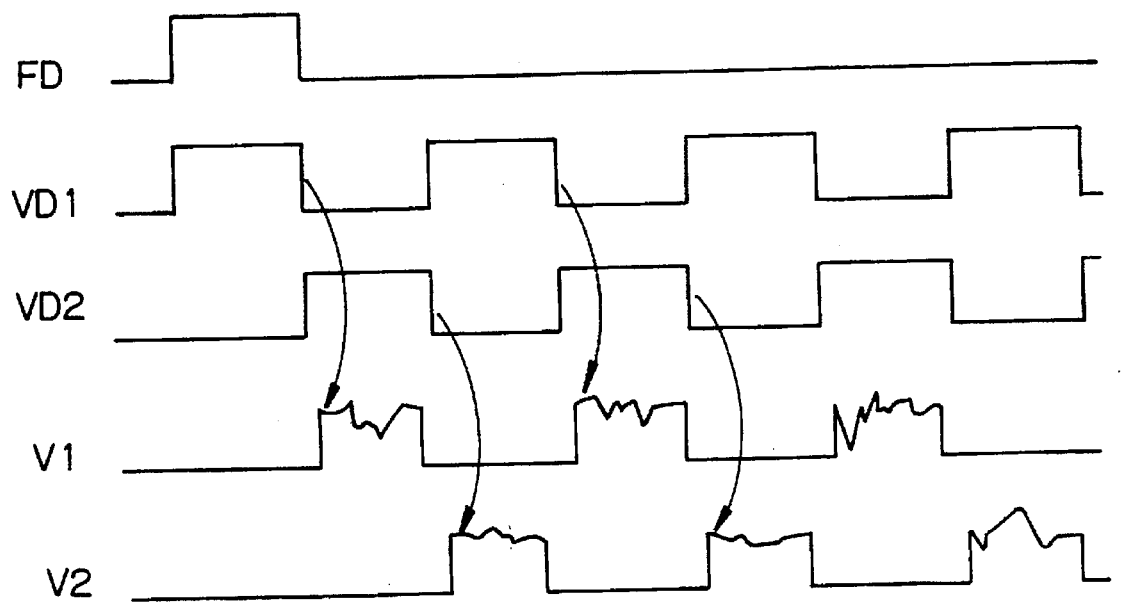
FIG. 10 is a time chart showing each of the signals of the drive circuit.

FIG. 10 illustrates the timing signals FD, VD1, and VD2, as well as the timing of the output signals V1 and V2 from the multiplexer M1 and M2. In this case, the light detectors S11 through Smn function as a charge storage device, acting in such a way that the detector output of an odd column is read based on the fall of VD1, and the detector output of an even column is read based on the fall of DV2. This circuit structure therefore operates in such a way that while light is incident on the detectors of an odd column, the operation alternates between reading the detector output of an even column that contains an already stored charge and performing a reverse procedure.

It is also possible to use a charge transfer method in which CCD camera sensors are used instead of the multiplexes M1 and M2.

It is also possible with this circuit to read the detector output of an even column by delaying the signal VD1 and using this delayed signal as a trigger, and to read the detector output of an odd column by delaying the signal VD2 and using this delayed signal as a trigger. Another alternative is to delay the respective rises of the signals VD1 and VD2, and to read the output of each detector with the aid of these delayed signals.

Figure 11:
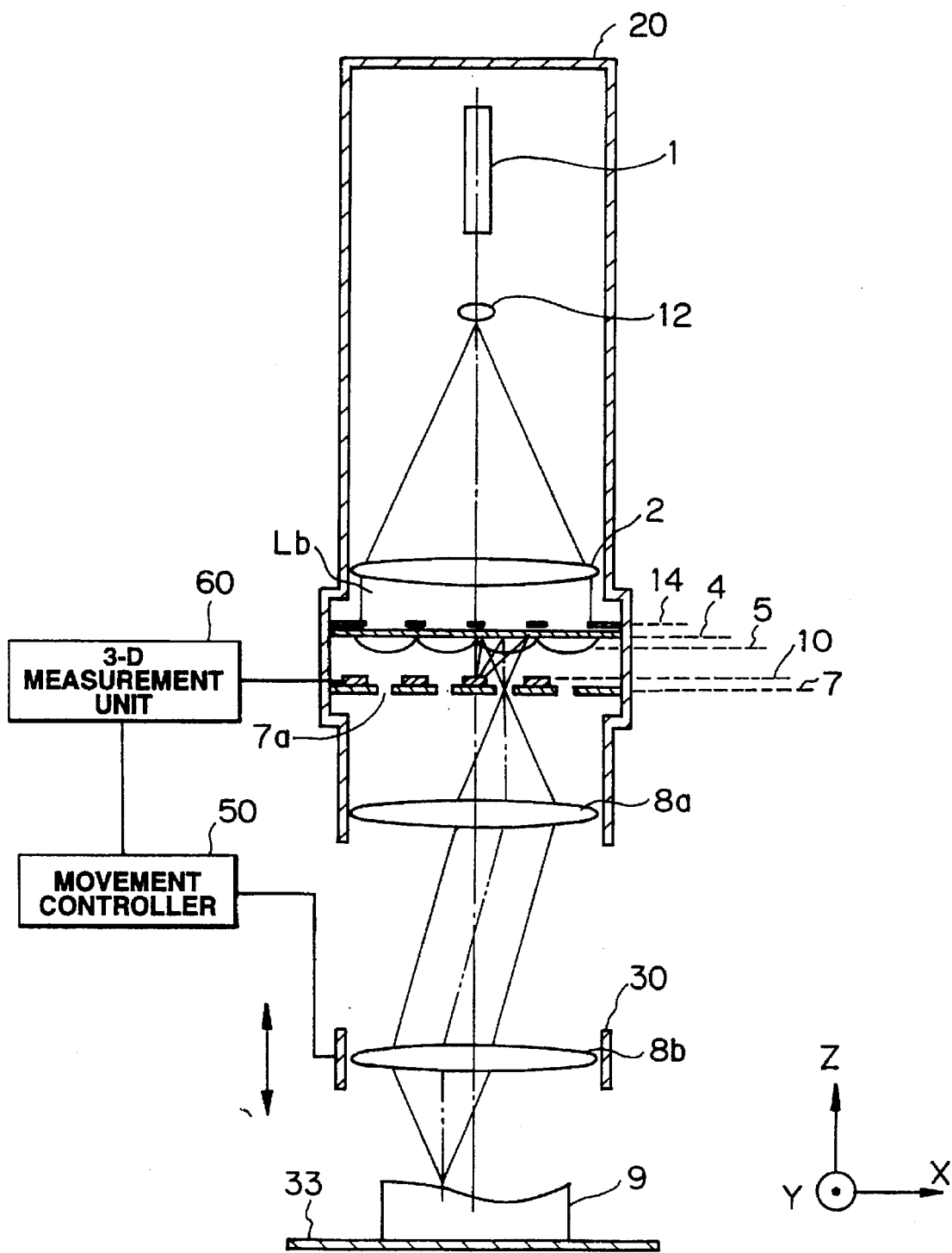
FIG. 11 is a diagram illustrating a second embodiment of this invention.

FIG. 11 illustrates another embodiment of this invention. In this case, parallel-plane light rays Lb of a nonscanning type are used instead of slit parallel light of the scanning type, as in the embodiment in FIG. 1 above. In addition, the movable portion 30 consists of a lens 8a alone, and all the other parts are located in the fixed portion 20. The other structures are the same as in the embodiment shown in FIG. 1, and structural elements performing the same functions are assigned identical symbols.

Specifically, laser light emitted from a laser light source 1 is transformed into parallel-plane light rays Lb by cylindrical lenses 12 and 2, and is directed toward an aperture array 14. Light that has passed through the apertures of the aperture array 14 is caused to converge toward a measurement object 9 in the same manner as above via a hologram 4, lens array 5, a pinhole array 7, and lenses 8a and 8b. Light scattered on the measurement object 9 passes through the lenses 8a and 8b, pinhole array 7, and lens array 5, strikes the hologram 4, and enters the detectors of a light detector array 10 after being diffracted by the hologram 4.

Because parallel-plane light rays Lb are used in this case, the return light of the parallel-plane light rays Lb enters all the detectors of the light detector array 10 simultaneously.

Since this embodiment involves constructing the movable portion 30 from the lens 8b alone, the weight of moving parts can be reduced, and the structure for performing movable scanning can be simplified.

Even when parallel-plane light rays Lb are used in the manner shown in FIG. 11, the portion underneath the aperture array 14 (aperture array 14, hologram 4, lens array 5, light detector array 10, pinhole array 7, and lenses 8a and 8b) may be constructed as a movable portion, as shown in FIG. 1 above. It is also possible to configure all the structural elements (except for the measurement object 9) in FIG. 11 in the form of a movable portion 30.

Figure 12:
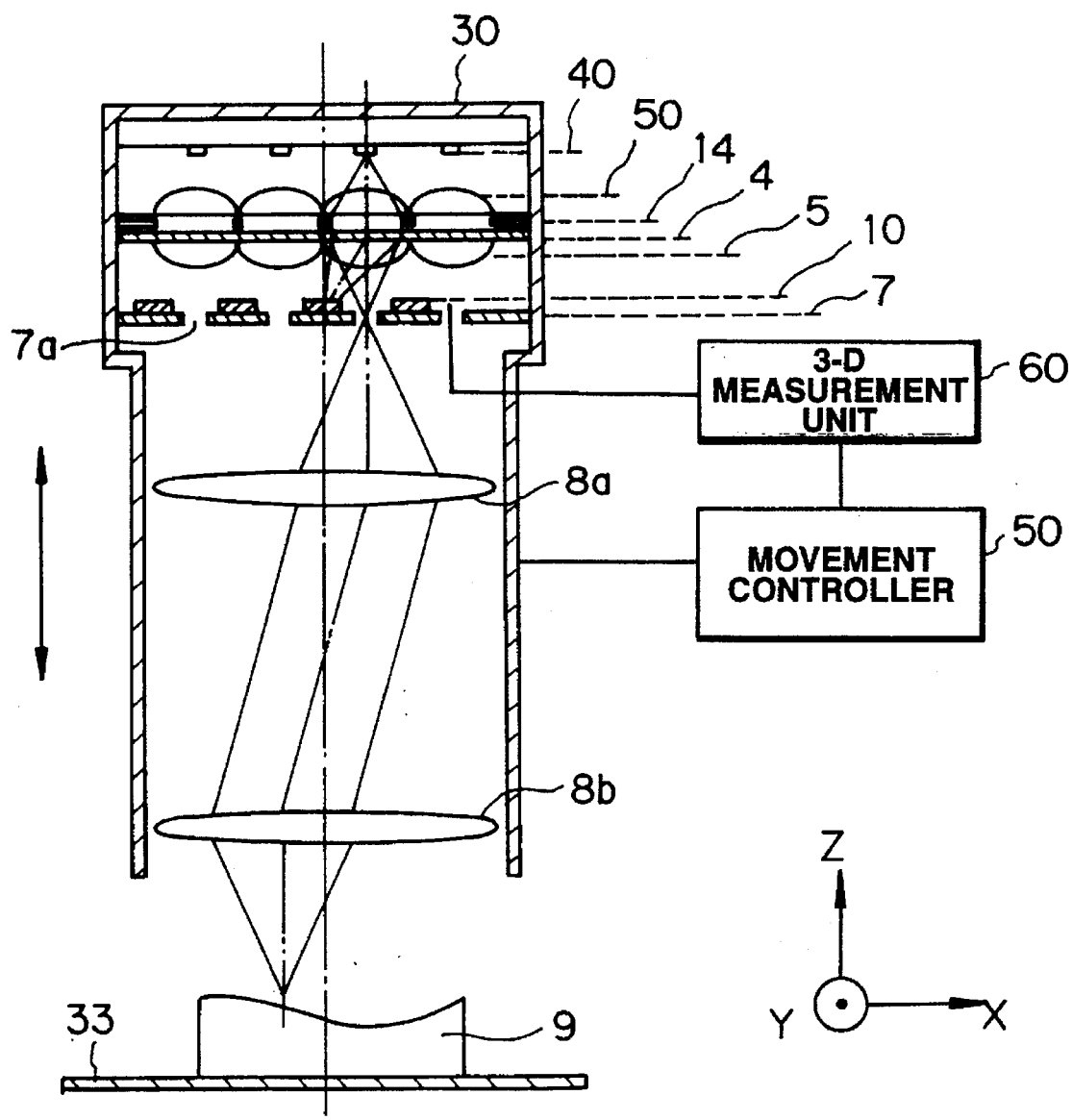
FIG. 12 is a diagram illustrating a third embodiment of this invention.

FIG. 12 shows yet another embodiment of this invention. The entire apparatus is configured as a movable portion 30 in this case. In addition, a laser light source array 40 in which a plurality of laser elements are arranged in a matrix is used as the light source for generating surface light rays. This laser light source array is known as the array-type surface light generation semiconductor laser of Photonics Research Incorporated. In addition, a lens array 50 is used as the lens for converting into parallel light the light rays that are output by the array-type surface light generation semiconductor laser 40. The other structures are the same as in the embodiment of FIGS. 1 or 11, and structural elements performing the same functions are assigned identical symbols.

Specifically, in FIG. 12, laser light emitted from the laser light source 40 is transformed into parallel-plane light rays by the lens array 50, and is directed toward an aperture array 14. Light that has passed through the apertures of the aperture array 14 is caused to converge toward a measurement object 9 in the same manner as above via a hologram 4, lens array 5, pinhole array 7, and lenses 8a and 8b. Light scattered on the measurement object 9 passes through the lenses 8a and 8b, pinhole array 7, and lens array 5, strikes the hologram 4, and enters the detectors of a light detector array 10 after being diffracted by the hologram 4.

This embodiment also allows the array-type surface light generation laser 40 to emit light sequentially in column units and to function as slit light, as in the embodiment illustrated in FIG. 1 above.

Figure 13:
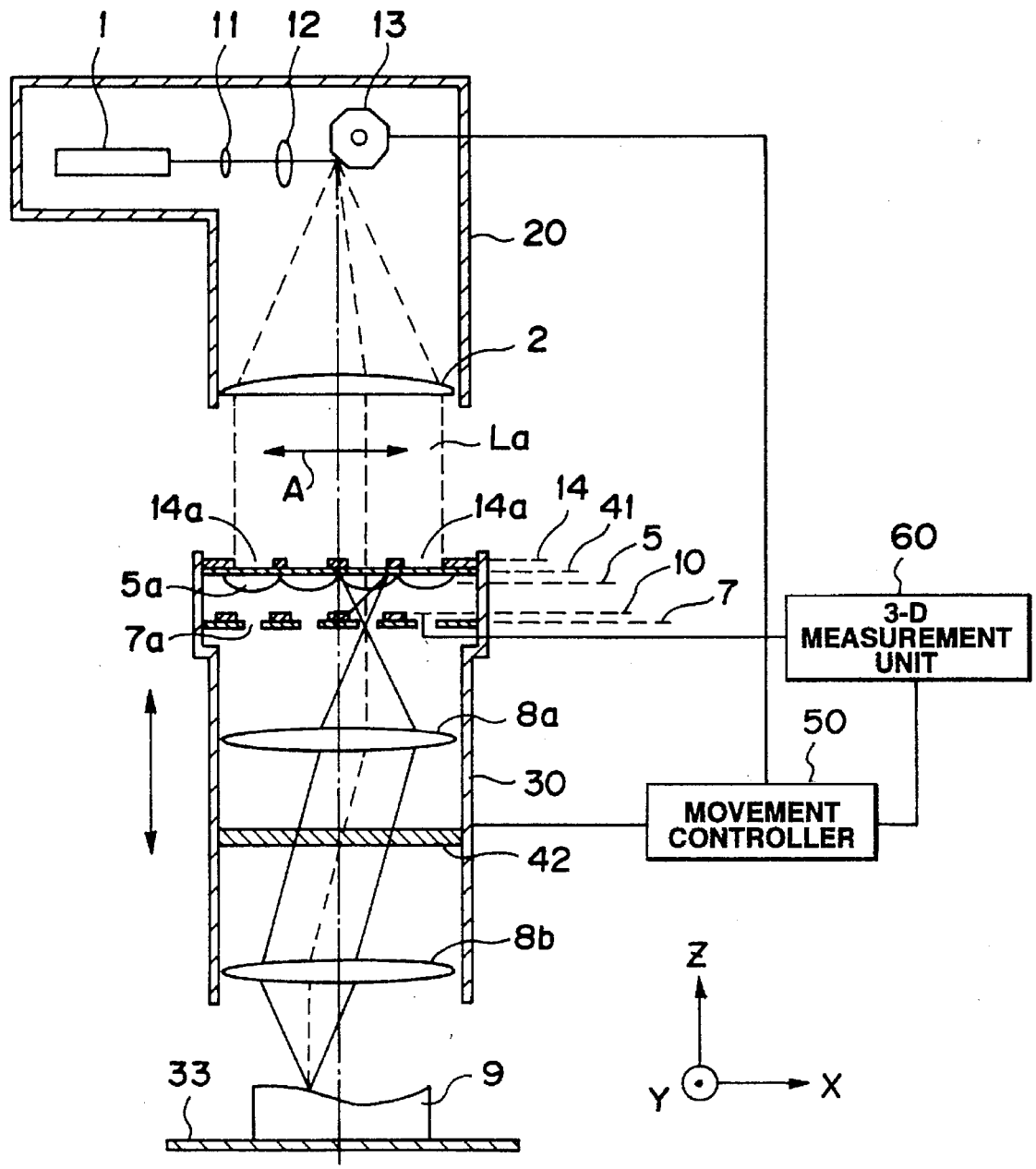
FIG. 13 is a diagram illustrating a fourth embodiment of this invention.
Figure 14:
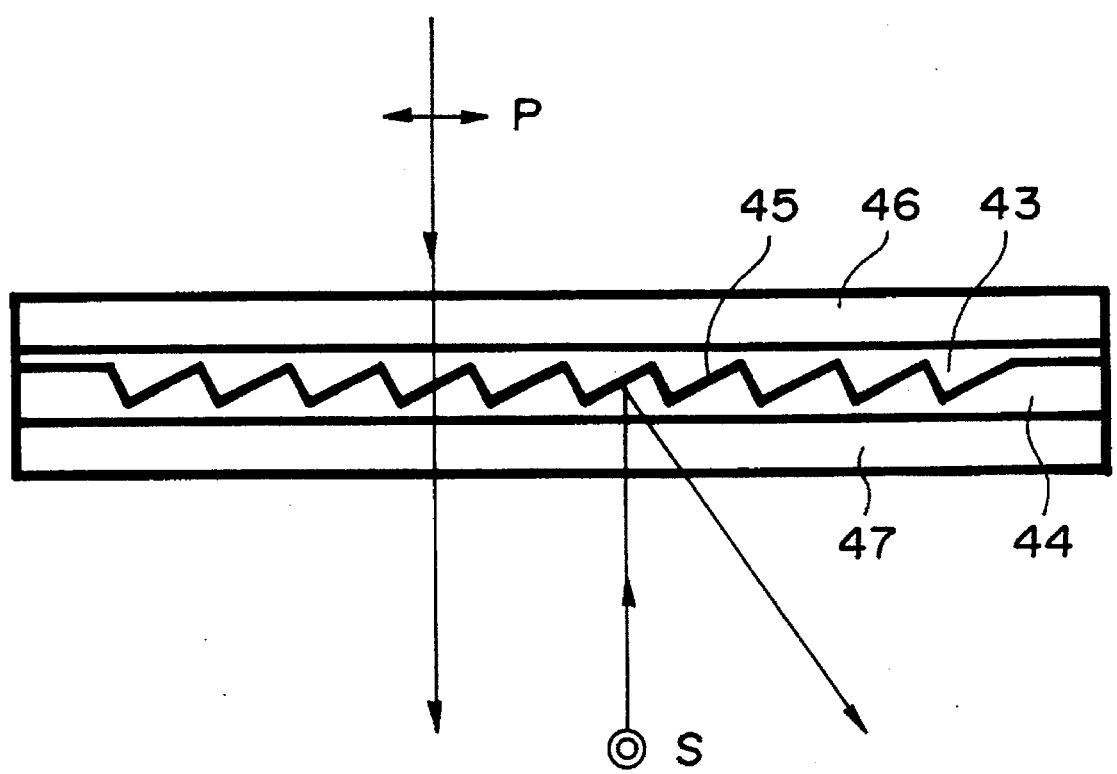
FIG. 14 is a diagram illustrating the diffraction grating-type half-mirror used in the fourth embodiment.

FIG. 13 illustrates still another embodiment of this invention. In this embodiment, a diffraction grating-type half-mirror 41 such as that shown in FIG. 14 is used instead of the reflection hologram 4 used in the aforementioned embodiments, and a quarter-wave plate 42 is interposed between the lenses 8a and 8b. The quarter-wave plate 42 in FIG. 13 can be located in any position as long as it is in the optical path of the confocal optical system.

The diffraction grating-type half-mirror 41 acts as a half-mirror and a diffraction grating in the same manner as the aforementioned reflection hologram 4, and is described in Japanese Laid-Open Patent Application 61-17103. Specifically, transparent members 43 and 44 of substantially the same refractive index are provided with a plurality of inclined surfaces, a polarization-dependent reflective film 45 is formed on these inclined surfaces, yielding a relief-type diffraction grating, and the assembly is supported by two parallel flat plates 46 and 47 on both sides. The reflective film 45 is configured in such a way that its transmittance is approximately 100% with respect to P polarized light and its reflectivity is approximately 100% with respect to S polarized light.

When, therefore, a P polarized wave is emitted from the light source 1 using a laser with linear polarization characteristics, the P polarized wave strikes the diffraction grating-type half-mirror 41, and almost all the wave passes through. This P polarized wave then passes through the quarter-wave plate 42, becomes circularly polarized light, and is caused to converge on the measurement object 9 by an object lens 8b. Light reflected from the measurement object 9 becomes an S polarized wave as a result of passing through the quarter-wave plate 42, strikes the diffraction grating-type half-mirror 41 via a lens 8a and pinhole 7, reflects from the reflective film 45 of the half-mirror 41, and enters a light detector 10.

The embodiment illustrated in FIGS. 2, 11, or 12 above also allows a diffraction grating-type half-mirror 41 such as that shown in FIG. 14 to be used instead of the hologram 4. It is apparent that a quarter-wave plate 42 is installed in the optical path of the confocal optical system.

Figure 15:
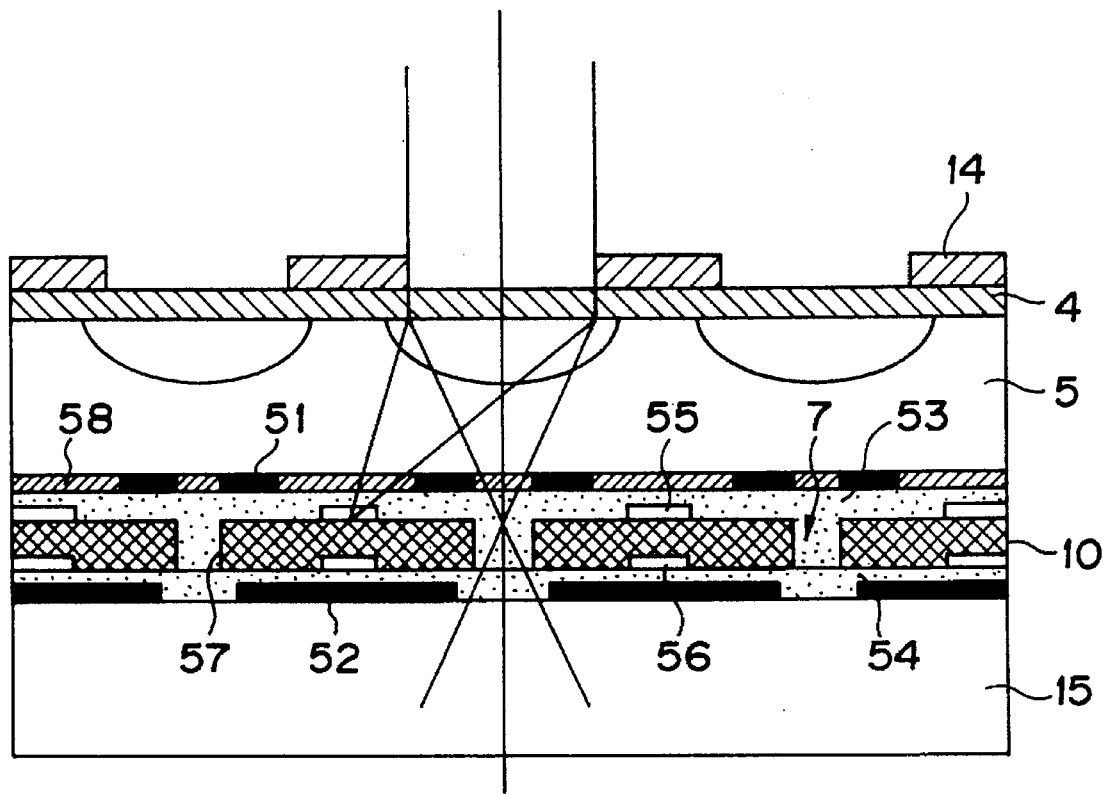
FIG. 15 is a cross section illustrating other structures adopted for a hologram, lens array, light detector array, and other components.
Figure 16A:
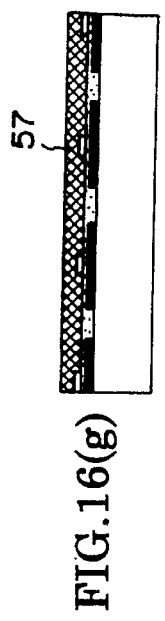
FIGS. 16a through 16m are a flow chart illustrating an example of a manufacturing sequence for the structure of FIG. 15.
Figure 16B:
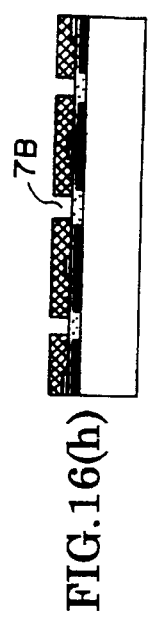
Figure 16C:
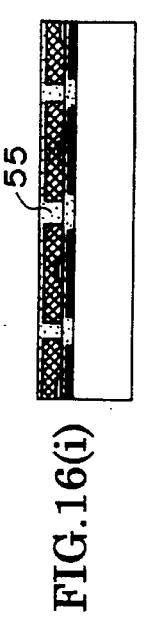
Figure 16D:
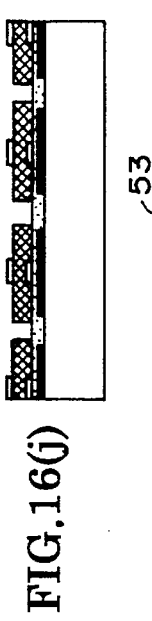
Figure 16E:
Figure 16F:
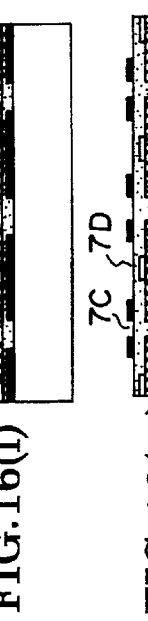
Figure 16G:
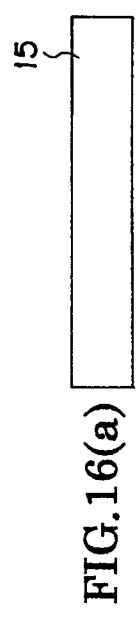
Figure 16H:
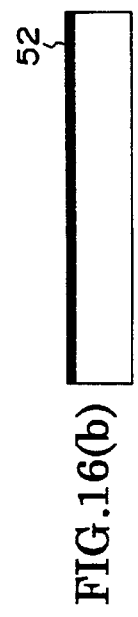
Figure 16I:
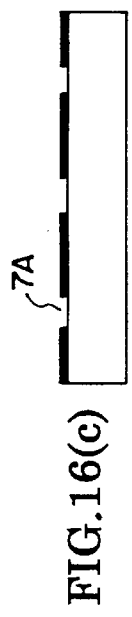
Figure 16J:
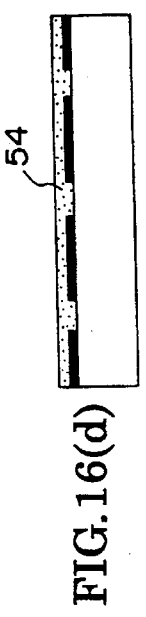
Figure 16K:
Figure 16L:
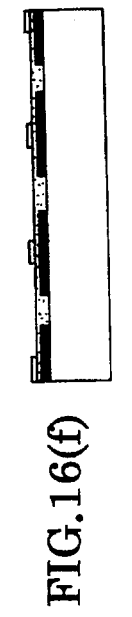
Figure 16M:

Next, FIG. 15 illustrates a modified embodiment of the sheet-shape optical instrument portion shown in FIG. 5 above. Here, the microlens array 5 and light detector array 10 are bonded instead of the microlens array 5 and glass substrate 15, as was the case in FIG. 5 above.

Specifically, the function of the light detector array 10 and the function of the pinhole array 7 are performed with the aid of a structure comprising an upper shielding film 51, a lower shielding film 52, and upper insulating film 53, a lower insulating film 54, an upper electrode 55, a lower electrode 56, and a light detector portion 57. These structural portions are bonded to the microlens array 5 by a refractive index adjusting solution 58 or the like.

FIGS. 16a through 16m illustrate the process for manufacturing the pinhole array 7 and light detector array 10 of the structure shown in FIG. 15. The details of the process will now be described in accordance with the manufacturing sequence.

(a) Planar Glass substrate 15.

(b) A lower shielding film 52 is formed on the planar glass substrate 15.

(c) A pinhole array 7A is formed on the lower shielding film 52.

(d) A lower insulating film 54 is formed on top of this.

(e) A lower electrode 56 is further formed as a film on top of this.

(f) The pattern of the lower electrode 56 is formed.

(g) The light detector portion (amorphous silicon) 57 is further formed as a film on top of this.

(h) A pinhole array 7B is formed on the light detector portion 57.

(i) The upper electrode 55 is formed as a film.

(j) The pattern of the upper electrode 55 is formed.

(k) The upper insulating film 53 is formed as a film.

(l) The upper shielding film 51 is formed as a film.

(m) A pinhole array 7C is formed on the upper shielding film 51, as is the opening portion 7D of the light detector.

Figure 17:
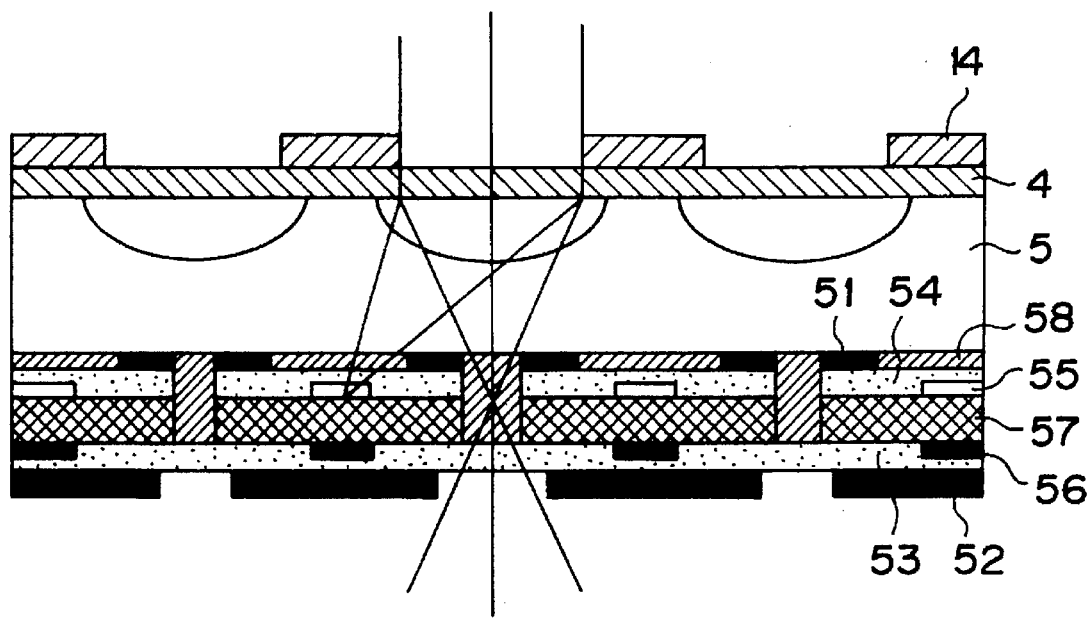
FIG. 17 is a cross section illustrating other structures adopted for a hologram, lens array, light detector array, and other components.

Next, FIG. 17 illustrates an embodiment in which the light detector portion 57 is made not of amorphous silicon but of a single crystal silicon semiconductor, and the structural elements performing the same functions as in FIG. 15 are assigned identical symbols.

Figure 18:
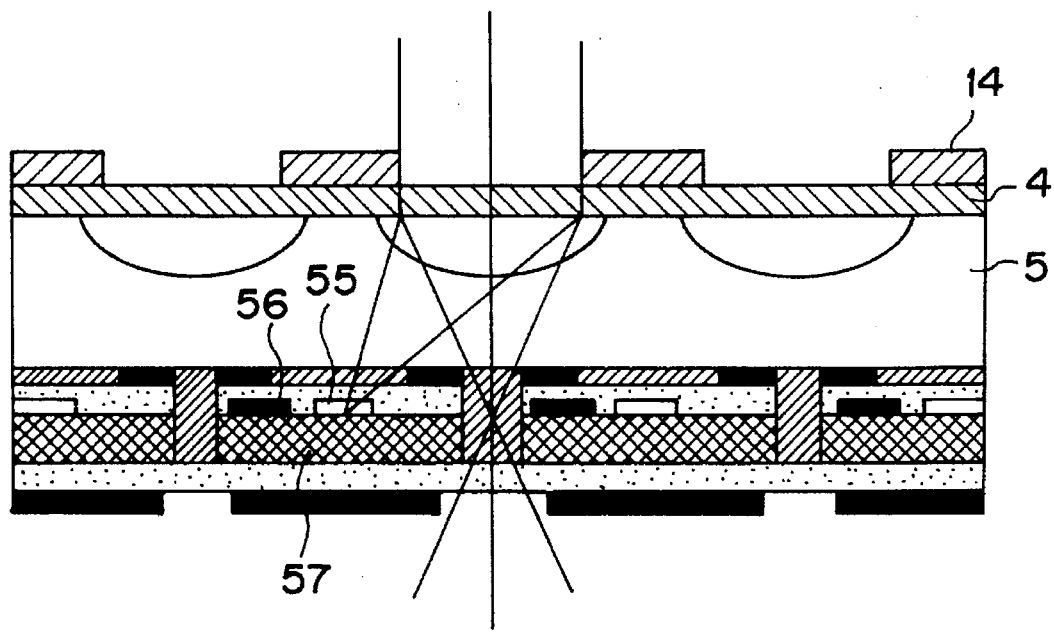
FIG. 18 is a cross section illustrating other structures adopted for a hologram, lens array, light detector array, and other components.

Specifically, an $SiO_2$ film is formed in this case on both surfaces of a silicon substrate using thermal oxidation or CVD, and a pn junction is formed by thermal diffusion or ion implantation using this $SiO_2$ film as a mask, yielding a light detector array portion. Subsequently, an $SiO_2$ film is again formed, patterning is performed, and a pinhole array is formed by RIE or other such etching technology. The light detector array having pinholes thus fabricated is then bonded to the microlens array 5 with the aid of a refractive index adjusting solution 58. Silicon and a microlens array may also be directly joined using a lamination SOI technique during bonding with the microlens. It is also possible to replace the single crystal silicon with a III-V group semiconductor or other material capable of photoelectric transfer. In addition, the upper electrode 55 and the lower electrode 56 may be sandwiched, as in the embodiment shown in FIGS. 15 or 17, or they may be formed within the same plane, as shown in FIG. 18.

Figure 19A:
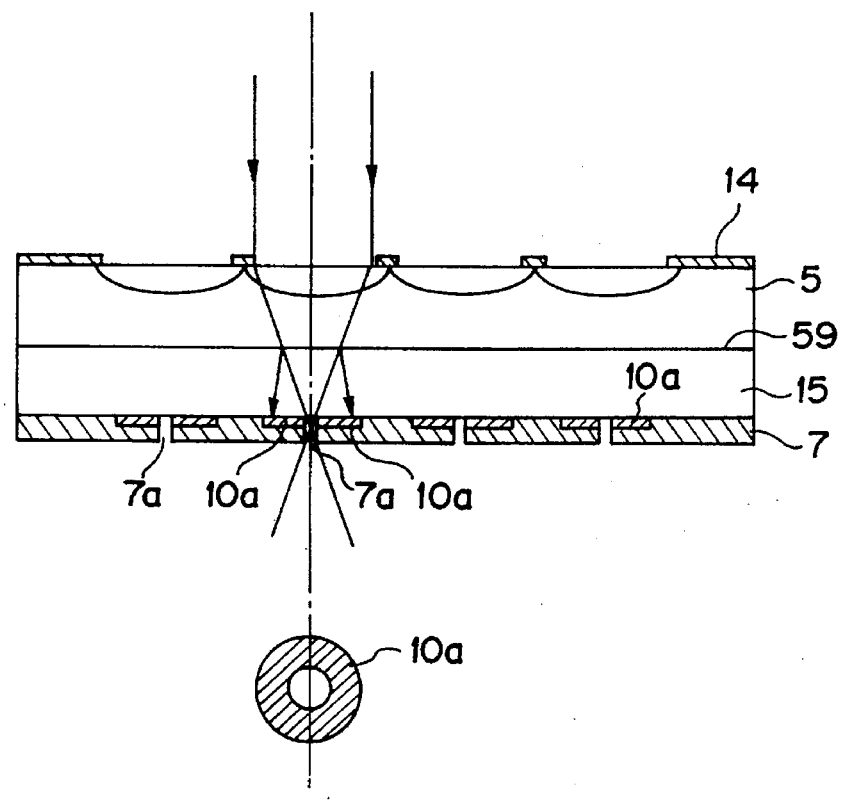

Next, FIG. 19a illustrates yet another modified example of the sheet-shape optical instrument portion shown in FIGS. 5 or 15; FIG. 19b is a plan view of an annular light detector 10a.

Specifically, FIGS. 19a and 19b show a case in which the function of the half-mirror can be performed by a half-mirror coating film 59 and in which light reflected by the half-mirror film 59 can be detected by making the light detector array 10 annular in shape.

In the structure shown in FIGS. 19a and 19b, light from a light source is passed through an aperture array 14 formed in a shielding film, condensed by the microlenses of the microlens array 5, and transmitted through pinholes 7a formed in a glass substrate 15. Light reflected by a measurement object passes through the pinholes 7a, reflects from the half-mirror coating film 59, and enters the annular light detector 10a.

The annular light detector 10 and the pinhole array 7 are formed on the glass substrate 15 by a semiconductor process.

Figure 20:
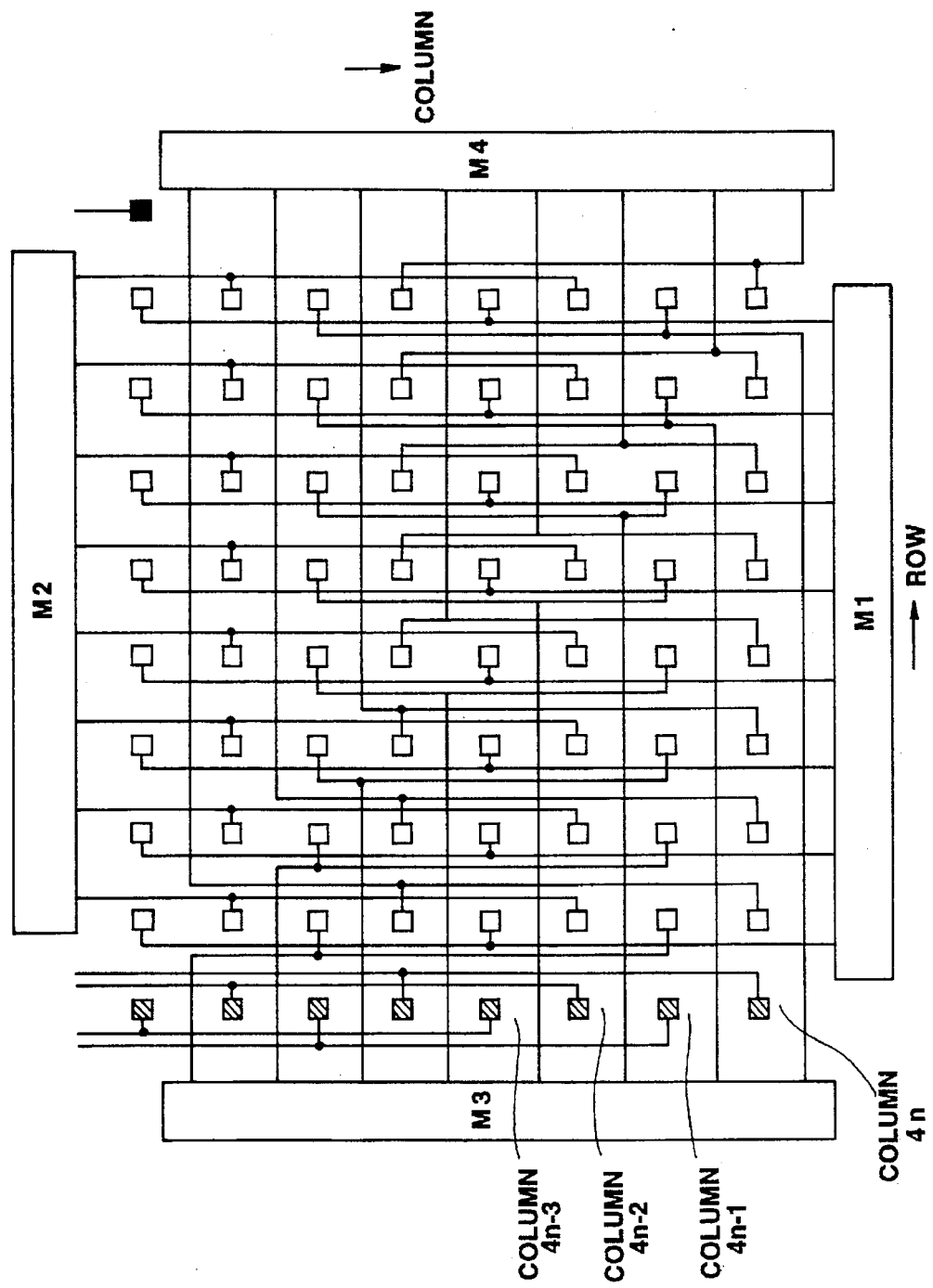
FIG. 20 is a diagram illustrating an example of another structure of a drive circuit for the light detector array.

FIG. 20 illustrates a modified embodiment of a circuit structure for reading the signals of each of the detectors of the light detector array 10 shown in FIG. 9 above. In this case, each of the detectors is divided into four blocks.

Specifically, light detectors in the (4n−3) column are connected to an analog multiplexer M1; light detectors in the (4n−2) column, to an analog multiplexer M2; light detectors in the (4n−1) column, to an analog multiplexer M3; and light detectors in the 4n column, to an analog multiplexer M4. The number of divisions is increased in comparison with the previous embodiment involving division into two parts, making it possible to increase the speed at which signals are read.

The analog multiplexers may be connected to the light detector array by wire bonding or the like, or they may be made into a monolith together with the light detector array inside the same substrate. It is also possible to divide the assembly into a plurality of blocks not only in the column direction but also in the row direction.

Figure 21:
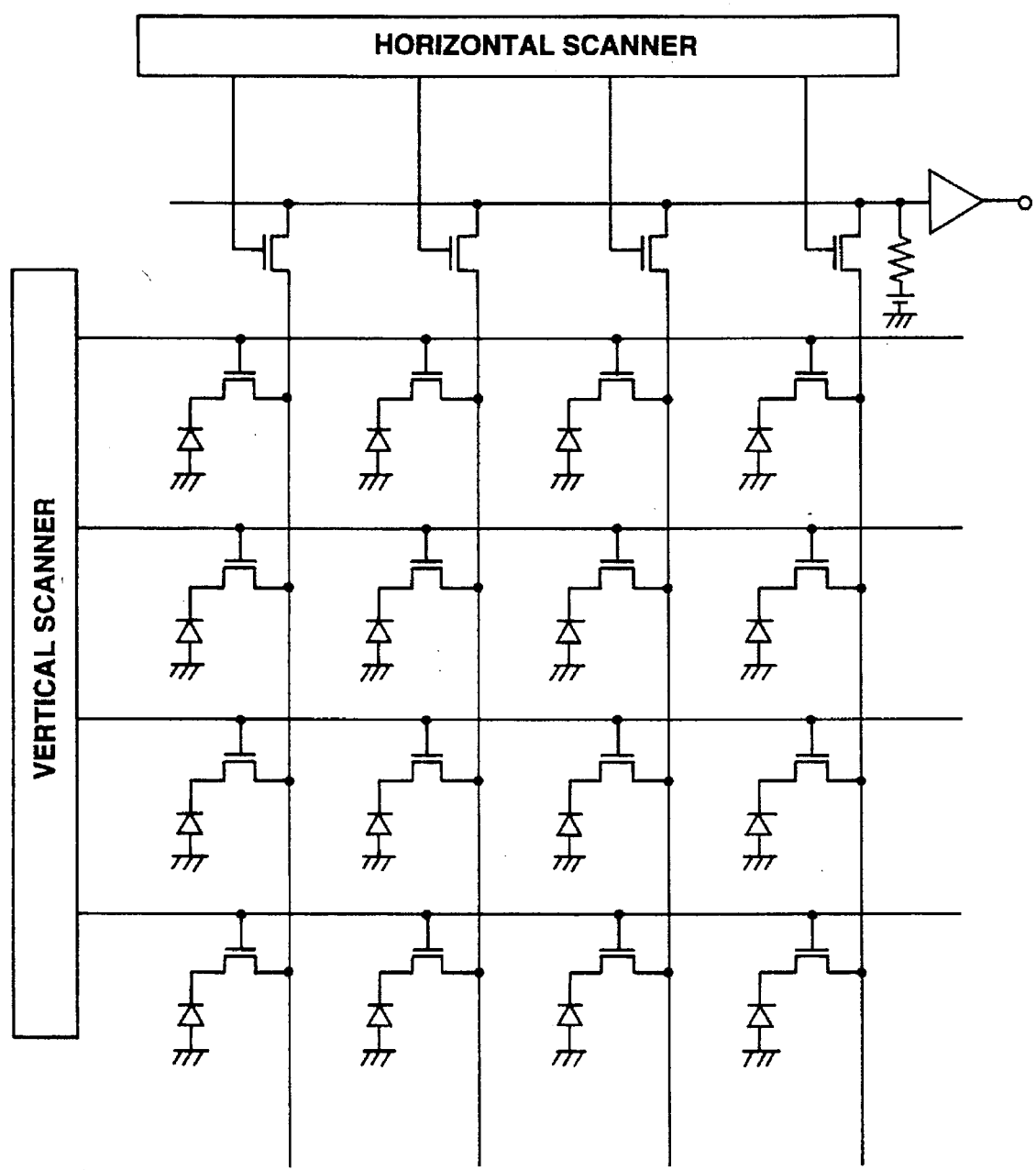
FIG. 21 is a diagram illustrating an example of another structure of a drive circuit for the light detector array.
Figure 22:
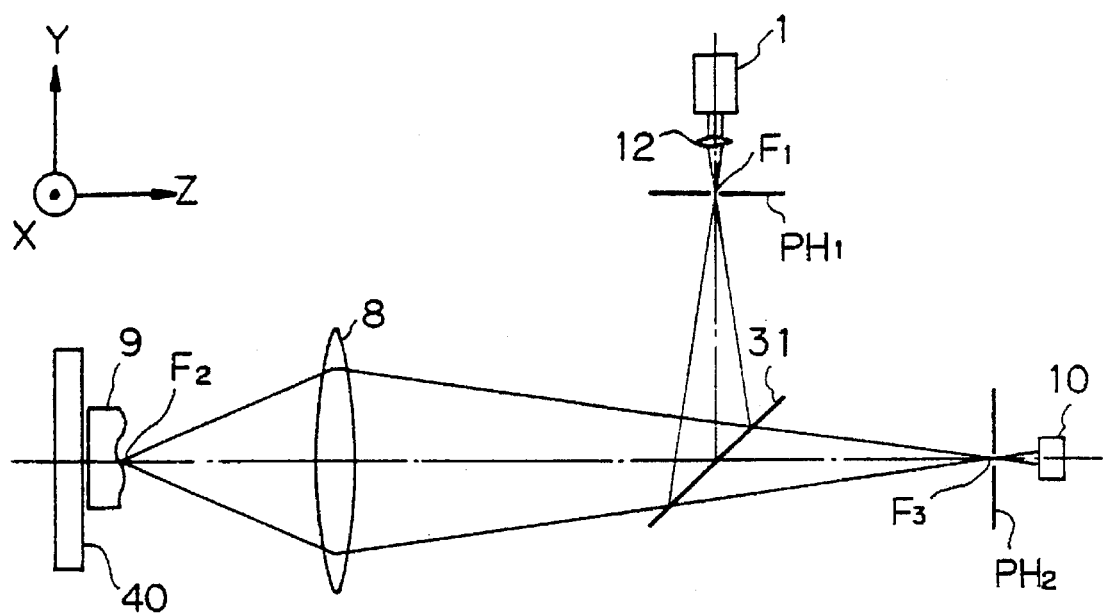
FIG. 22 is a diagram illustrating the principle of a confocal optical system.
Figure 23A:
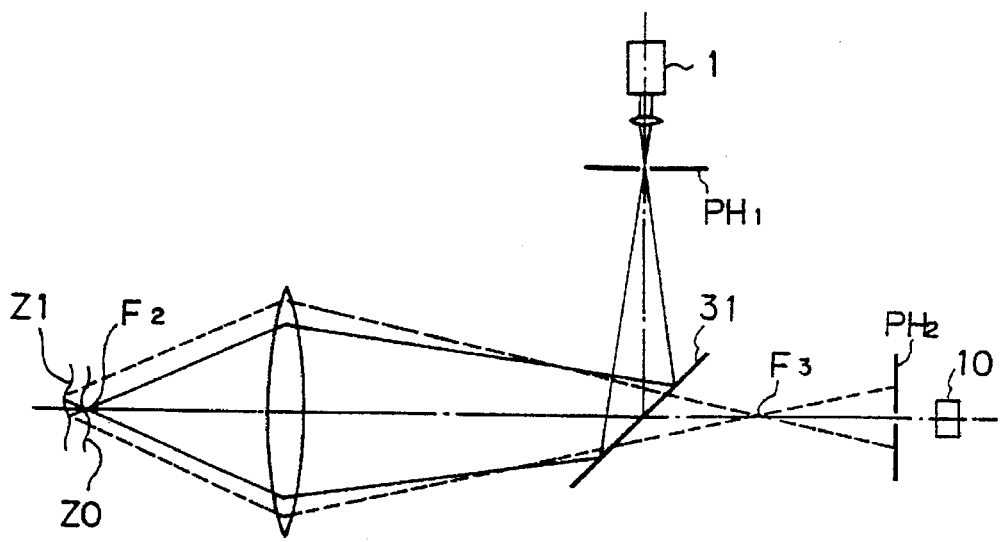
FIGS. 23a and 23b are diagrams illustrating the manner in which the focal point of a confocal optical system is shifted.
Figure 23B:
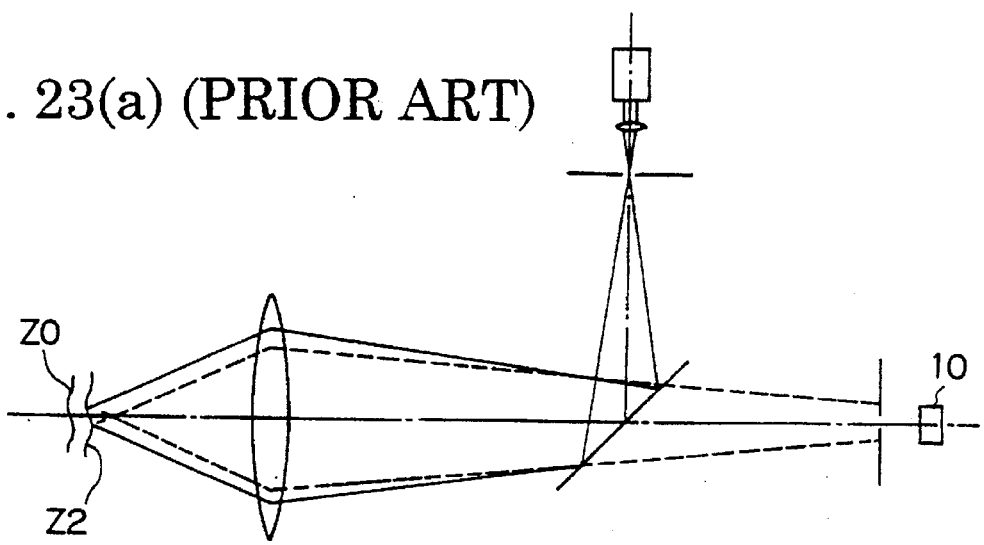
Figure 24:
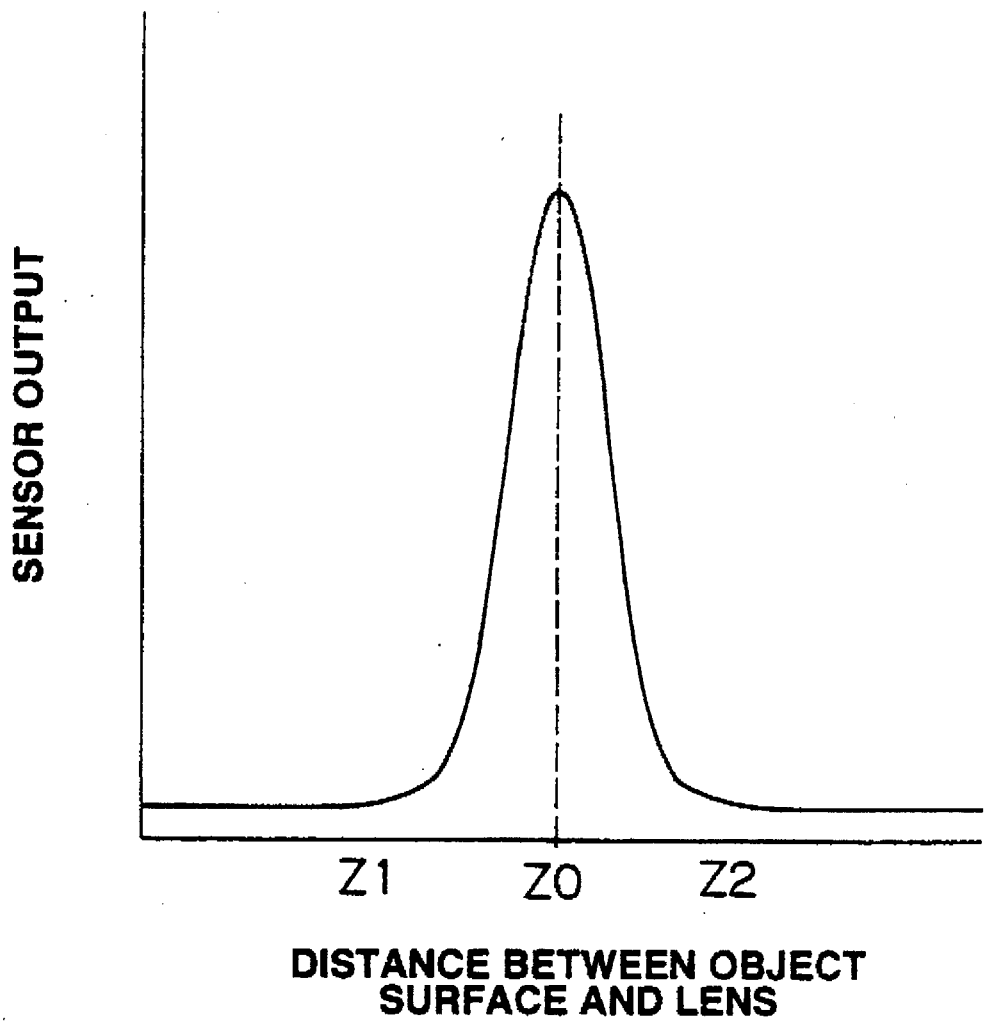
FIG. 24 is a diagram illustrating the output of a light sensor in relation to the distance between the object surface and the lens.
Figure 25:
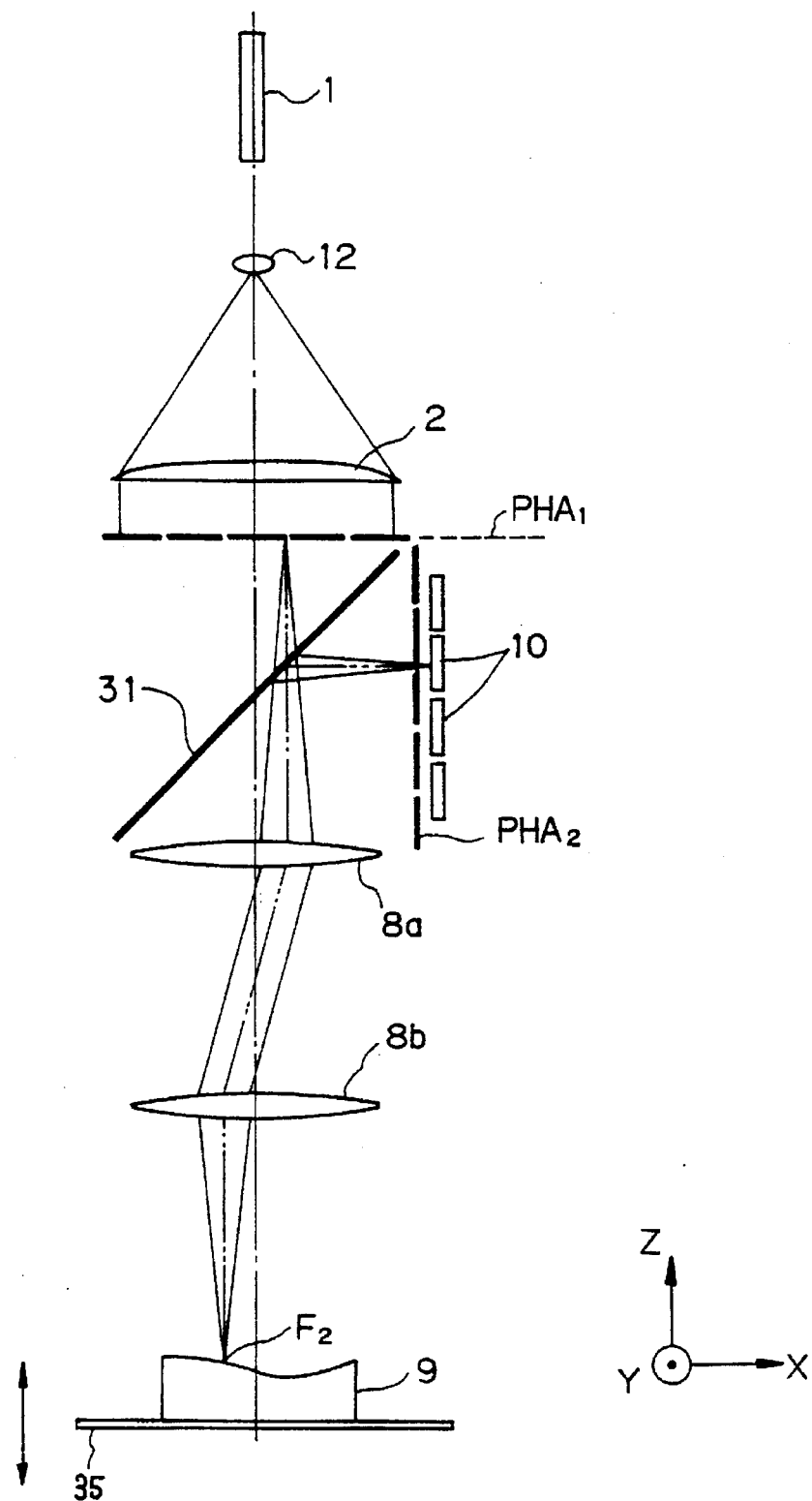
FIG. 25 is a diagram illustrating an example of a conventional three-dimensional shape measuring instrument using a confocal optical system.

Next, FIG. 21 illustrates a circuit for reading signals from a light detector array irradiated with surface light rays, as shown in FIG. 11 or 12. It is possible in this case to adopt an X-Y address system in which transistors and other switching elements are incorporated into the light detector array. A charge transfer system may be adopted for the read mode.

The measurement object 9 was fixed in the embodiments shown in FIGS. 1, 11, and 12, although it is also possible to adopt a movable structure in which the measurement object 9 is placed on an X-Y moving stage, and measurements are conducted by suitably varying the measurement object field. In addition, higher-resolution measurements can be performed by adopting a structure in which this X-Y moving stage or movable portion 30 can be microscopically displaced in the X-Y direction.

The embodiments shown in FIGS. 1, 11, and 12 also allow all the measurement instruments to be fixed and three-dimensional measurements to be performed by movably scanning the measurement object 9 in three-dimensional directions.

Although only one example of the structure of the confocal optical system was described, other structures may also be adopted as long as they can perform the same functions as the embodiments.

Industrial Applicability

This invention can be used as a three-dimensional measurement apparatus for measuring the shape of a measurement object in three dimensions.

We claim:

1. A confocal optical apparatus comprising:

a light source;

a first aperture portion for passing therethrough light emitted from the light source and obtaining a point source;

an objective lens for causing the light that has been passed through the first aperture portion to converge on a measurement object;

a second aperture portion located on a plane conjugate with the image on the measurement object caused by said objective lens; and a light detector for detecting light that has been passed through the second aperture portion, characterized in that the first and second aperture portions are located in the same position and are conjointly used as an identical aperture portion, and a detection surface of the light detector is located substantially on the same surface as the conjointly used identical aperture portion.

2. A confocal optical apparatus comprising:

a light source;

an optical element for receiving light from the light source and acting as a half-mirror and a diffraction grating;

first condensing means positioned at the optical element, for condensing zero-order light from the optical element;

a pinhole for passing light condensed by the first condensing means; and second condensing means for condensing the light that has passed through the pinhole and causing the light to converge toward a measurement object, and for causing the light scattered on the measurement object to converge toward the pinhole, wherein the optical element directs first-order diffracted light of the light reintroduced toward the first condensing means via the pinhole and the first condensing means, and wherein the confocal optical apparatus further comprises a light detector for receiving the first-order diffracted light condensed by the first condensing means.

3. A confocal optical apparatus comprising:

parallel slit light generating means for generating parallel slit light undergoing sequential movable scanning;

an aperture array comprising a plurality of apertures for light passage arranged in two dimensions, for passing therethrough the parallel slit light from the parallel light generating means;

an optical element for receiving the light that has passed through the aperture array and acting as a half-mirror and a diffraction grating;

a lens array positioned close to the optical element and comprising a plurality of two-dimensionally arranged lenses for condensing zero-order light from the optical element;

a pinhole array comprising a plurality of two-dimensionally arranged pinholes for passing therethrough light condensed by each of the lenses of the lens array; and condensing means for condensing the light that has passed through each of the pinholes and projecting the light onto a measurement object, and for causing the light scattered on the measurement object to converge toward each of the pinholes, wherein the optical element directs toward the lens array first-order diffracted light of the light reintroduced via each of the pinholes and the lens array; and wherein the confocal optical apparatus further comprises:

a light detector array comprising a plurality of two-dimensionally arranged light detectors for receiving the first-order diffracted light condensed by each of the lenses of the lens array;

movement control means for moving in the direction of the optical axis at least some Of the parallel slit light generating means, aperture array, optical element, lens array, pinhole array, condensing means, and light detector array; and a three-dimensional distance measuring means for measuring the measurement object in three dimensions based on the output of each light detector in accordance with the movable scanning of the parallel slit light and with the movement control of the movement control means.

4. A confocal optical apparatus as defined in claim 3, characterized in that the aperture array, optical element, lens array, pinhole array, and light detector array are of laminated structure.

5. A confocal optical apparatus as defined in claim 3, wherein the light detectors of the light detector array are arranged in a two-dimensional matrix, these detectors are divided into a plurality of blocks, and the light detectors of each block are connected by a common connecting wire to ensure connection to a common signal extraction circuit for each block.

6. A confocal optical apparatus as defined in claim 3, characterized in that the three-dimensional distance measuring means sequentially reads the detection signals of the light detectors in block units in the course of the movable scanning of the parallel slit light.

7. A confocal optical apparatus comprising:

a surface light ray generating means for generating surface light rays;

an aperture array comprising a plurality of apertures for light passage arranged in two dimensions, for passing therethrough the surface light rays from the surface light ray generating means;

an optical element for receiving light that has passed through the aperture array and acting as a half-mirror and a diffraction grating;

a lens array positioned close to the optical element and comprising a plurality of two-dimensionally arranged lenses for condensing zero-order light from the optical element;

a pinhole array comprising a plurality of two-dimensionally arranged pinholes for passing light condensed by each of the lenses of the lens array; and a condensing means for condensing the light that has passed through each pinhole and projecting the light onto a measurement object, and for causing the light scattered on the measurement object to converge toward each pinhole, wherein the optical element directs toward the lens array first-order diffracted light of the light reintroduced via each of the pinholes and the lens array; and wherein the confocal optical apparatus further comprises:

a light detector array comprising a plurality of two-dimensionally arranged light detectors for receiving the first-order diffracted light condensed by each of the lenses of the lens array;

movement control means for moving in the direction of the optical axis at least some of the surface light ray generating means, aperture array, optical element, lens array, pinhole array, condensing means, and light detector array; and a three-dimensional distance measuring means for measuring the measurement object in three dimensions based on the output of each light detector in accordance with the movement control of the movement control means.

8. A confocal optical apparatus as defined in claim 7, characterized in that the aperture array, optical element, lens array, pinhole array, and light detector array are of laminated structure.

9. A confocal optical apparatus as defined in claim 7, wherein the surface light ray generating means is a light source array in which a plurality of light generating elements are arranged in a matrix.

* * * * *